(12) United States Patent
Martinez Ayala et al.

(10) Patent No.: US 12,141,179 B2
(45) Date of Patent: Nov. 12, 2024

(54) SYSTEM AND METHOD FOR GENERATING ONTOLOGIES AND RETRIEVING INFORMATION USING THE SAME

(71) Applicant: OntogenAI, Inc., Miami, FL (US)

(72) Inventors: Diego Fernando Martinez Ayala, Cundinamarca (CO); Brian Sanchez, Miami, FL (US); Carlos Alejandro Jimenez Holmquist, Bogota (CO)

(73) Assignee: OntagenAI, Inc., Miami, FL (US)

( * ) Notice: Subject to any disclaimer, the term of this patent is extended or adjusted under 35 U.S.C. 154(b) by 401 days.

(21) Appl. No.: 17/387,720

(22) Filed: Jul. 28, 2021

(65) Prior Publication Data
US 2023/0030086 A1 Feb. 2, 2023

(51) Int. Cl.
G06F 40/20 (2020.01)
G06F 16/31 (2019.01)
G06F 16/33 (2019.01)
G06F 16/36 (2019.01)
G06N 5/02 (2023.01)

(52) U.S. Cl.
CPC ........ *G06F 16/3335* (2019.01); *G06F 16/322* (2019.01); *G06F 16/367* (2019.01); *G06F 40/20* (2020.01); *G06N 5/02* (2013.01)

(58) Field of Classification Search
CPC ............... G06F 16/3335; G06F 16/322; G06F 16/367; G06F 40/20; G06F 16/3344; G06F 40/30; G06N 5/02; G06N 3/0455; G06N 3/09; G06N 5/022
See application file for complete search history.

(56) References Cited

U.S. PATENT DOCUMENTS 7,630,981 B2 12/2009 Xu et al.
8,171,029 B2 5/2012 Marvit et al.
8,620,964 B2 12/2013 Tsatsou et al.
(Continued)

OTHER PUBLICATIONS

Burton-Jones, Andrew, et al. "A semiotic metrics suite for assessing the quality of ontologies." Data & Knowledge Engineering 55.1 (2005), pp. 84-102 (Year: 2005).*

(Continued)

*Primary Examiner* — Jesse S Pullias
*Assistant Examiner* — Michael C. Lee
(74) *Attorney, Agent, or Firm* — Sagacity Legal PLLC

(57) ABSTRACT

A system and method for automatically generating organization level ontology for knowledge retrieval, are provided. An input/output unit receives a plurality of documents from document sources and an ontology generation system generates the organization level ontology based on the documents. The ontology generation system extracts one or more nodes and directed relationships from each document and generates an intermediate document ontology for each document. A combination of syntactic, semantic, and pragmatic assessment of intermediate document ontology is performed to assess at least structure and adaptability of the ontology. The ontology generation system further generates a refined document ontology, based on assessment, to satisfy one or more quality metrics. Each of the refined document ontologies is integrated together to generate the organization level ontology. Further, a knowledge retrieval system is operatively coupled to the ontology generation system and processes one or more search queries using the generated organization level ontology.

18 Claims, 19 Drawing Sheets

(56) References Cited

U.S. PATENT DOCUMENTS

| | | | |
|---|---|---|---|
| 9,282,307 B2 | 3/2016 | Lahr et al. | |
| 10,095,689 B2 | 10/2018 | Lobez Comeras et al. | |
| 10,810,246 B2 | 10/2020 | Mittal et al. | |
| 2012/0233160 A1* | 9/2012 | Koomullil | G06F 16/367 707/E17.014 |
| 2016/0196360 A1* | 7/2016 | Best | G06F 16/24522 707/722 |
| 2016/0217128 A1* | 7/2016 | Baum | G06F 40/284 |
| 2020/0311111 A1 | 10/2020 | Ferreira Moreno et al. | |
| 2020/0401770 A1 | 12/2020 | Paley et al. | |
| 2021/0027175 A1 | 1/2021 | Jensen et al. | |
| 2021/0034652 A1 | 2/2021 | Masood | |
| 2021/0049664 A1 | 2/2021 | Lundgaard et al. | |
| 2022/0156582 A1* | 5/2022 | Sengupta | G06N 3/042 |
| 2022/0215167 A1* | 7/2022 | Rajpathak | G06F 40/30 |

OTHER PUBLICATIONS

Gaeta, Matteo, et al. "Ontology extraction for knowledge reuse: The e-learning perspective." IEEE Transactions on Systems, Man, and Cybernetics-Part A: Systems and Humans 41.4 (2011), pp. 798-809 (Year: 2011).*

Song, Fuqi, et al. "An ontology-driven framework towards building enterprise semantic information layer." Advanced Engineering Informatics 27.1 (2013), pp. 38-50. (Year: 2013).*

Freihat, Abed Alhakim, et al. "A taxonomic classification of wordnet polysemy types." Proceedings of the 8th Global WordNet Conference (GWC). 2016, pp. 1-9 (Year: 2016).*

McDaniel, Melinda, et al. "Evaluating domain ontologies: clarification, classification, and challenges." ACM Computing Surveys (CSUR) 52.4 (2019), pp. 1-44 (Year: 2019).*

* cited by examiner

SYSTEM AND METHOD FOR GENERATING ONTOLOGIES AND RETRIEVING INFORMATION USING THE SAME

BACKGROUND OF THE INVENTION

In the past decade, the amount of data created, captured, copied, and consumed globally has increased by over five thousand percent (5,000%). As businesses, governments, and consumers worldwide embrace digital productivity, especially when remote virtual work has become a norm, management, storage, and accessibility of digital documentation have become critical. It is common, for example, for a particular digital document to be stored repeatedly by various users in multiple repositories within an organization; and after that be accessed subsequently for multiple purposes. However, the redundancy in storing such documents may make searching for information complex and inefficient. Searching for a document or set of documents that help answer a question or even create a new document with specific intent can be a daunting task, full of lists and, in the best case, filters for dates and tags. Although tools have been developed to organize and search information within digital documents, most use indexes, tags, or labels to retrieve information, which may be challenging to implement in an organization level knowledgebase. Some of these tools may alternatively or additionally rely on vast amounts of data to generate models for associating documents with queries to facilitate subsequent information retrievals.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
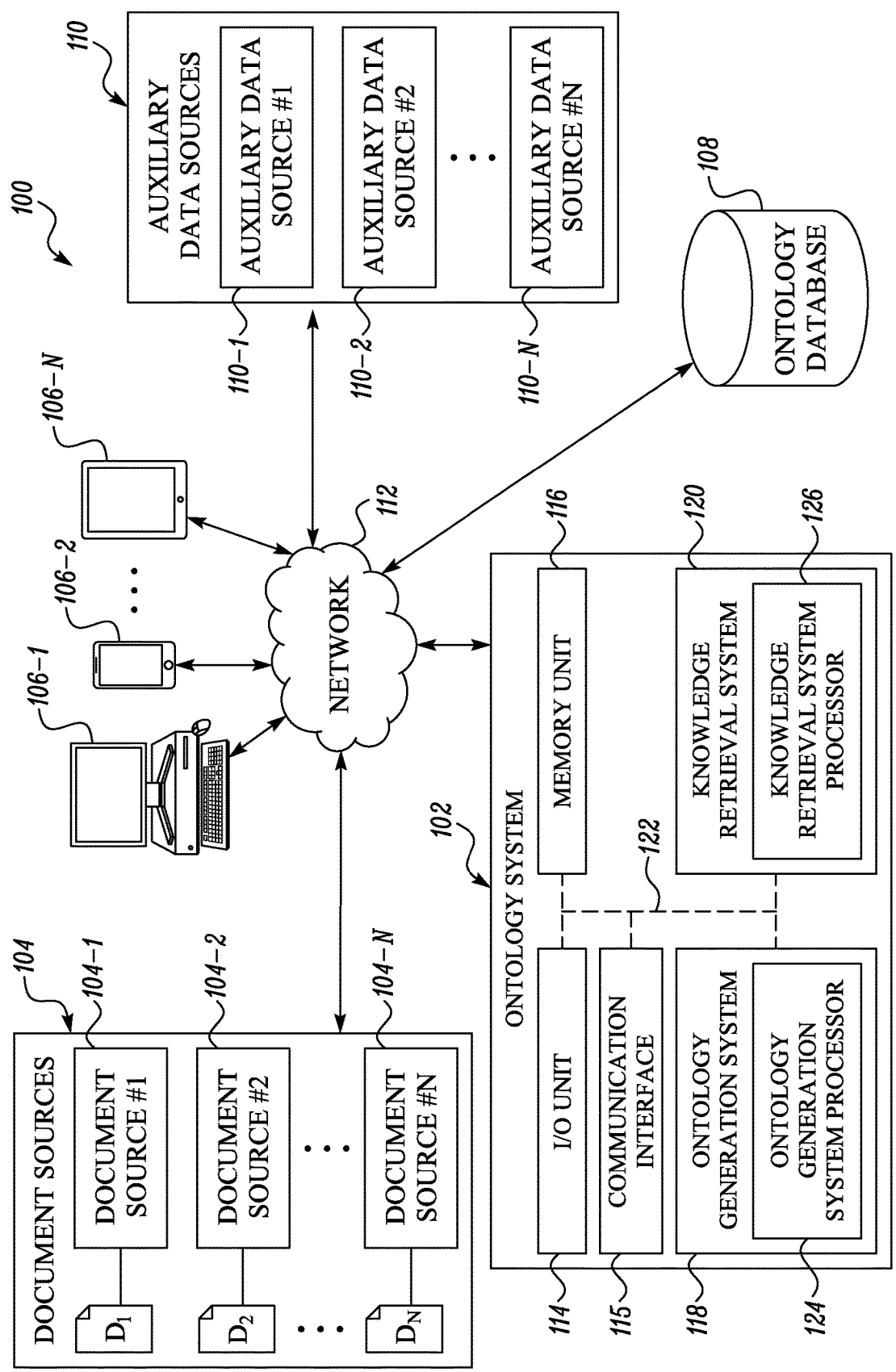
FIG. 1 illustrates a block diagram of an environment implementing an exemplary system for automatically generating an organization level ontology, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented, where appropriate, by conventional symbols in the drawings, showing only those specific details that are pertinent to understanding the embodiments so as not to obscure the description with details that will be readily apparent to those of ordinary skill in the art having the benefit of the description herein.

DETAILED DESCRIPTION OF THE INVENTION

A system and a method provide for automatically generating an organization level ontology and efficiently retrieving knowledge using the generated organization level ontology. In general, an ontology may be a tool for effective and efficient interpretation of information and automated reasoning, in that, ontologies represent a formalized structure of the types, properties, and interrelationships of various entities, concepts, within a domain. For example, an organization level ontology may represent various entities present in a quantity of documents associated with an organization and how these entities are related to one another. However, since every document and information may be interpreted differently by different people, generating an effective and meaningful ontology becomes challenging. Additionally, most known processes of generating ontologies require significant human intervention, making them complex, cumbersome, and expensive.

To this end, in one aspect, a system for automatically generating an organization level ontology for knowledge retrieval is provided. The system includes an input/output unit, a memory unit, an ontology generation unit, and a knowledge retrieval system. The input/output unit is configured to receive a plurality of documents from one or more document sources. The memory unit is configured to store the plurality of documents received from the one or more document sources. The ontology generation system is operatively coupled to the input/output unit and the memory unit and is configured to generate the organization level ontology. The ontology generation system includes an extraction unit, a generation unit, an ontology assessment unit, an ontology refinement unit, and an ontology integration unit. The extraction unit is configured to extract from each of the plurality of documents, one or more nodes and one or more directed relationships among the extracted one or more nodes. For each of the plurality of documents, the generation unit is configured to generate an intermediate document ontology including the extracted one or more nodes and the one or more directed relationships. Further, the ontology assessment unit is configured to perform an assessment of the intermediate document ontology, the assessment being a combination of a syntactic assessment, a semantic assessment, and a pragmatic assessment of the intermediate document ontology. The assessment is performed to assess at least the structure and adaptability of the intermediate document ontology. The ontology refinement unit is configured to generate a refined document ontology, based on the assessment, that is optimized to satisfy one or more quality metrics. Furthermore, the ontology integration unit is configured to integrate each of the generated refined document ontologies to generate the organization level ontology. Moreover, the knowledge retrieval system is operatively coupled to the ontology generation system and is configured to process one or more search queries using the generated organization level ontology.

In another aspect, a method for automatically generating an organization level ontology for knowledge retrieval is provided. The method includes receiving, by an input/output unit, a plurality of documents from one or more document sources. The organization level ontology is generated by an ontology generation system based on the received plurality of documents. Generating the organization level ontology includes extracting, by an extraction unit, from each of the plurality of documents, one or more nodes and one or more directed relationships among the extracted one or more nodes. Further, an intermediate document ontology is generated, by a generation unit, for each of the plurality of documents. The intermediate document ontology includes the extracted one or more nodes and the one or more directed relationships. An assessment of the intermediate document ontology is performed by an ontology assessment unit to assess at least the structure and adaptability of the intermediate document ontology. The assessment is a combination of a syntactic assessment, a semantic assessment, and a pragmatic assessment of the intermediate document ontology. Further, a refined document ontology is generated, by an ontology refinement unit, based on the assessment. The refined document ontology is optimized to satisfy one or more quality metrics. Further, all the generated refined document ontologies are integrated, by an ontology integration unit, to generate the organization level ontology. The method further includes processing, by a knowledge retrieval system that is operatively coupled to the ontology generation system, one or more search queries using the generated organization level ontology.

FIG. 1 illustrates an environment 100 implementing an exemplary ontology system 102 in accordance with the embodiments. The ontology system 102 is configured to automatically generate a machine-readable and human-readable organization level ontology and facilitate knowledge retrieval using the generated organization level ontology, for an organization. In various embodiments, an "organization" may include, but is not limited to, any small, medium, or large corporation, profit/non-profit business, school or university, or any other entity having one or more people working together to perform tasks and goals.

In addition to the ontology system 102, the environment 100 may also include one or more document sources 104, one or more user devices 106, an ontology database 108, and one or more auxiliary data sources 110, each communicating with one another and the ontology system 102 via a network 112. Examples of the network 112 may include, but are not limited to, a wide area network (WAN) (e.g., a transport control protocol/internet protocol (TCP/IP) based network), a cellular network, or a local area network (LAN) employing any of a variety of communications protocols as is well known in the art.

As illustrated, the one or more document sources 104 may include document sources 104-1, 104-2 . . . 104-n (collectively referred to as the document sources 104), that may be configured to provide a quantity of documents, such as document $D_1$, document $D_2$ . . . document $D_N$, to the ontology system 102 for generating the organization level ontology. For the sake of simplicity and purposes of explanation, every document source 104 is shown to provide one document to the ontology system 102; however, it may be contemplated that every document source 104 may even provide multiple documents to the ontology system 102, without deviating from the scope of the claimed subject matter. In an exemplary embodiment, the document sources 104 may be associated with the organization and may be configured to provide a quantity of documents that are relevant for the organization, to the ontology system 102. For example, a first employee of the organization may provide a first document $D_1$ via the document source 104-1, and a second employee of the organization may provide a second document $D_2$ via the document source 104-2 to the ontology system 102 for further processing. In alternative embodiments, the document sources 104 may not necessarily belong to a common organization but may be distributed or remote to the organization. In some implementations, the document sources 104 may be configured to create as well as send the documents while in some other implementations, the document sources 104 may only be configured to send documents, created remotely, to the ontology system 102 via the network 112.

In an example, the document sources 104 may be embodied as one or more network devices, such as, but not limited to, a personal computer, desktop computer, tablet, smartphone, or any other computing device capable of communicating with and transmitting documents to the ontology system 102. It will further be appreciated by those of ordinary skill in the art that the document sources 104 alternatively may function within a remote server, cloud computing device, or any other remote computing mechanism now known or in the future developed.

In some embodiments, each document source 104 may include a plurality of electrical and electronic components, providing power, operational control, communication, and the like. For example, each document source 104 may include, among other things, its own transceiver, display device, network interface, processor, and a memory (not shown) that cooperate to enable operations of the corresponding document source 104. Such components of a document source 104 are well known and hence are not described herein in greater detail for brevity.

Each of the document sources 104 may include appropriate interface(s), such as a touch screen display, keyboard, or any other input/output device, to facilitate providing inputs to and receiving output from the ontology system 102. In some alternative embodiments, the document sources 104 may be embodied as a document repository/database having a quantity of documents, stored therein, that may be relevant to the organization and may be configured to provide such documents to the ontology system 102 for further processing. In some yet other embodiments, the one or more document sources 104 may include a combination of network devices and document repositories/database working collaboratively to provide one or more documents to the ontology system 102 for generating the organization level ontology.

Further, the document sources 104 may be configured to provide documents having any of a structured and/or an unstructured form of data that may be relevant to the organization. Examples of the structured data may include, but are not limited to, dictionaries, excel worksheets, comma separated values (CSV) files, tab separated values (TSV) files, or any other type of structured data now known or in the future developed. Examples of the unstructured data may be any data presented in an unstructured format such as, but not limited to, agreements, letters, orders, invoices, and the like. It may be contemplated that the document sources 104 may additionally or alternatively provide documents with any other form of data that is presented in human-readable or machine-readable format.

Each of the one or more user devices 106, such as, 106-1, 106-2 ... 106-n, operates as an interface for a corresponding user interacting with the ontology system 102. In an example, each user device 106 may be embodied as a personal computer, desktop computer, tablet, smartphone, or any other computing device capable of communicating with and transmitting documents to the ontology system 102. Each of the user devices 106 may include appropriate interface(s), such as a touch screen display, keyboard, or any other input/output device, to facilitate providing inputs to and receiving output from the ontology system 102. Each user may utilize the respective user device 106 to provide one or more user inputs, such as, but not limited to, search queries, and receive one or more outputs, such as, but not limited to, search results, from the ontology system 102. In some embodiments, the one or more user devices 106 may include an application or a web portal or any other suitable interface through which the user may communicate to and from the ontology system 102. In some embodiments, each user device 106 may include a plurality of electrical and electronic components, providing power, operational control, communication, and the like within the user device 106. For example, each user device 106 may include, among other things, its transceiver, display device, network interface, processor, and a memory (not shown) that cooperate to enable operations of the corresponding user device 106. Such components of a user device 106 are well known and hence are not described herein in greater detail for brevity.

The ontology database 108 may be configured to store the one or more documents, organization level ontology, and any other data generated by the ontology system 102. The ontology database 108 may be queried by the ontology system 102 to retrieve relevant information corresponding to or in response to one or more search queries received from the user devices 106. For example, the ontology database 108 may be an internal and/or an external database and may be implemented using relational databases, such as, but not limited to, Sybase, Oracle, CodeBase, and Microsoft® SQL Server or other types of databases such as, a flat file database, an entity-relationship database, an object-oriented database, a record-based database, or any other type of database now known or in the future developed. It will be appreciated that the ontology database 108 may comprise any of the volatile memory elements (e.g., random access memory (RAM), nonvolatile memory elements (e.g., ROM), and combinations thereof. Moreover, the ontology database 108 may incorporate electronic, magnetic, optical, and/or other types of storage media.

The one or more auxiliary data sources 110, such as, the auxiliary data source 110-1, 110-2 ... 110-N, may be configured to provide auxiliary information that may be relevant or associated with one or more of the documents $D_1, D_2 \ldots D_n$ provided by the one or more document sources 104. In some exemplary implementations, the auxiliary data source 110 may include one or more data sources or data repositories available, such as via the Internet, that may provide information related to or relevant to the documents for generating the organization level ontology. Examples of the auxiliary data sources 110 may include, but are not limited to, Wikidata, DBpedia, Google Scholar, or other web based portals now known or in the future developed. It may be contemplated that any data source external to the document sources 104 or the organization may be considered as an auxiliary data source 110 without limiting the scope of the claimed subject matter. For example, the ontology system 102 may be configured to extract information relevant to the one or more documents from the one or more auxiliary data sources 110, such as by using querying, web crawling or web scraping techniques now known or in the future developed.

The ontology system 102 may be configured to generate the organization level ontology and facilitate knowledge retrieval using the generated organization level ontology. The ontology system 102 may include a plurality of electrical and electronic components, providing power, operational control, communication, and the like within the ontology system 102. In an exemplary embodiment, the ontology system 102 includes, among other components, an input/output unit 114, a communication interface 115, a memory unit 116, an ontology generation system 118, and a knowledge retrieval system 120.

It will be appreciated by those of ordinary skill in the art that FIG. 1 depicts the ontology system 102 in a simplified manner and a practical embodiment may include additional components and suitably configured logic to support known or conventional operating features that are not described in detail herein. It will further be appreciated by those of ordinary skill in the art that the ontology system 102 may be implemented as a server, a personal computer, desktop computer, tablet, smartphone, or any other computing device now known or developed in the future.

Further, although the entire ontology system 102 is shown and described to be implemented within a single computing device, it may be contemplated that the one or more components of the ontology system 102 may alternatively be implemented in a distributed computing environment, without deviating from the scope of the claimed subject matter. It will further be appreciated by those of ordinary skill in the art that the ontology system 102 alternatively may function within a remote server, cloud computing device, or any other remote computing mechanism now known or in the future developed. For example, the ontology system 102, in some embodiments, may be a cloud environment incorporating the operations of the input/output unit 114, the communication interface 115, the memory unit 116, the ontology generation system 118, and the knowledge retrieval system 120, and various other operating modules to serve as a software as a service model for the document sources 104 and the organization.

The components of the ontology system 102, including the input/output unit 114, the communication interface 115, the memory unit 116, the ontology generation system 118, and the knowledge retrieval system 120, may communicate with one another via an ontology system local interface 122. The ontology system local interface 122 may be, for example, but not limited to, one or more buses or other wired or wireless connections, as is known in the art. The ontology system local interface 122 may have additional elements, which are omitted for simplicity, such as controllers, buffers (caches), drivers, repeaters, and receivers, among many others, to enable communications. Further, the ontology system local interface 122 may include address, control, and/or data connections to enable appropriate communications among the aforementioned components.

The input/output (I/O) unit 114 may be used to receive one or more inputs from and/or to provide one or more system outputs to one or more devices or components. For example, the I/O unit 114 may be configured to receive a quantity of documents from the one or more document sources 104 and provide output in the form of a generated ontology to the ontology database 108 and/or provide document search results to one or more users, such as those of the user devices 106 interacting with the ontology system 102. System input may be received by the I/O unit 114 via, for example, a keyboard, touchpad, and/or a mouse associated with the document sources 104 and/or the user devices 106. System output may be provided by the I/O unit 114 via, for example, a display device, speakers, and/or a printer (not shown) associated with the document sources 104 and/or the user devices 106.

The communication interface 115 may be configured to enable the ontology system 102 to communicate on a network, such as the network 112, a wireless access network (WAN), a radio frequency (RF) network, and the like. The communication interface 115 may include, for example, an Ethernet card or adapter or a wireless local area network (WLAN) card or adapter. Additionally, or alternatively, the communication interface 115 may include a radio frequency interface for wide area communications such as Long Term Evolution (LTE) networks, or any other networks now known or developed in the future. The communication interface 115 may include address, control, and/or data connections to enable appropriate communications on the network 112.

The memory unit 116 may be configured to store the documents received from the one or more document sources 104, either locally or remotely, such as in the ontology database 108. For example, the memory unit 116 may include any of the volatile memory elements (e.g., random access memory (RAM), nonvolatile memory elements (e.g., ROM), and combinations thereof Moreover, memory unit 116 may incorporate electronic, magnetic, optical, and/or other types of storage media. Further, it may be contemplated that the memory unit 116 may have a distributed architecture, where various components are situated remotely from one another, and are accessed by the ontology system 102, and its components, such as the ontology generation system 118 and/or the knowledge retrieval system 120. The memory unit 116 may include one or more software programs, each of which includes an ordered listing of executable instructions for implementing logical functions. The software in the memory unit 116 may include a suitable operating system and one or more programming codes for execution by the components, such as the ontology generation system 118 and/or the knowledge retrieval system 120 of the ontology system 102. The operating system may be configured to control the execution of the programming codes and provide scheduling, input-output control, file and data management, memory management, and communication control, and related services. The programming codes may be configured to implement the various processes, algorithms, methods, techniques, etc., described herein.

In an exemplary embodiment, the ontology generation system 118 may be configured to receive the documents from each of the one or more document sources 104 and generate the organization level ontology based on the received documents. The ontology generation system 118 includes an ontology generation system processor 124 that is a hardware device for executing software instructions, such as the software instructions stored in the memory unit 116. The ontology generation system processor 124 may be any custom made or commercially available processor, a central processing unit (CPU), an auxiliary processor among several processors associated with the ontology generation system processor 124, a semiconductor-based microprocessor, or generally any device for executing software instructions. When the ontology generation system 118 is in operation, the ontology generation system processor 124 may be configured to execute software stored within the memory unit 116 to communicate data to and from the memory unit 116, and to generally control operations of the ontology generation system 118 pursuant to the software instructions.

In an embodiment, the knowledge retrieval system 120 may be operatively coupled to the ontology generation system 118 and configured to process one or more search queries, received from one or more users, such as via the one or more user devices 106, using the generated organization level ontology. The knowledge retrieval system 120 may further be configured to provide for display, via the input/output unit 114 on a display, such as a display of the user device 106, one or more search results, and a traversable pathway to access the one or more documents corresponding to the search results in response to the received search queries. The knowledge retrieval system 120 includes a respective processor, such as a knowledge retrieval system processor 126 that is also a hardware device for executing software instructions, such as the software instructions stored in the memory unit 116. The knowledge retrieval system processor 126 may be any custom made or commercially available processor, a central processing unit (CPU), an auxiliary processor among several processors associated with the knowledge retrieval system 120, a semiconductor-based microprocessor, or generally any device for executing software instructions. When the knowledge retrieval system 120 is in operation, the knowledge retrieval system processor 126 may be configured to execute software stored within the memory unit 116 to communicate data to and from the memory unit 116, and to generally control operations of the knowledge retrieval system 120 pursuant to the software instructions.

The detailed functionalities and operations of the ontology generation system 118 and the knowledge retrieval system 120 will now be described in greater detail in the following description.

Generation of Organization Level Ontology

Figure 2:
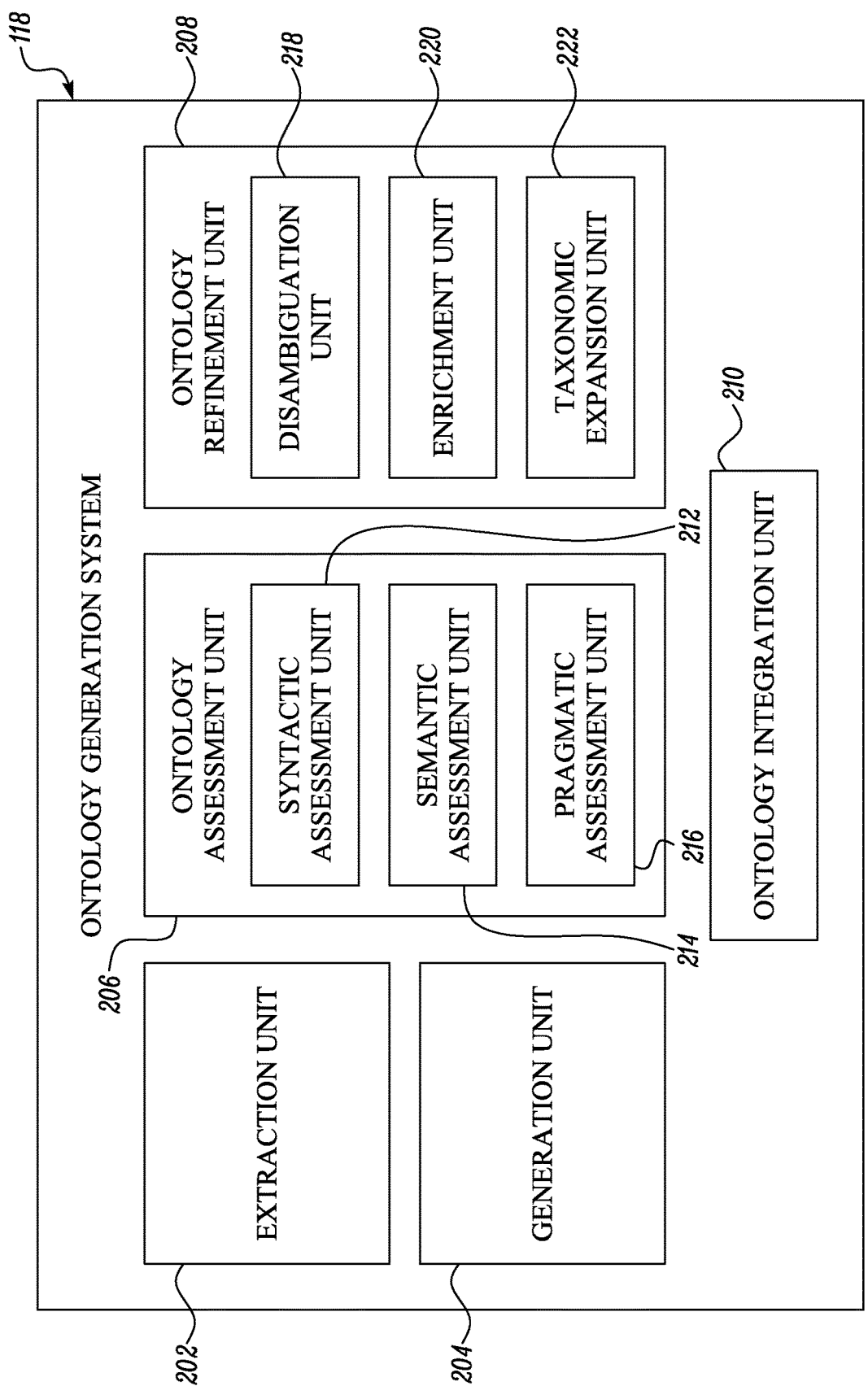
FIG. 2 illustrates a block diagram of an exemplary ontology generation system within the system of FIG. 1, in accordance with some embodiments.
Figure 3:
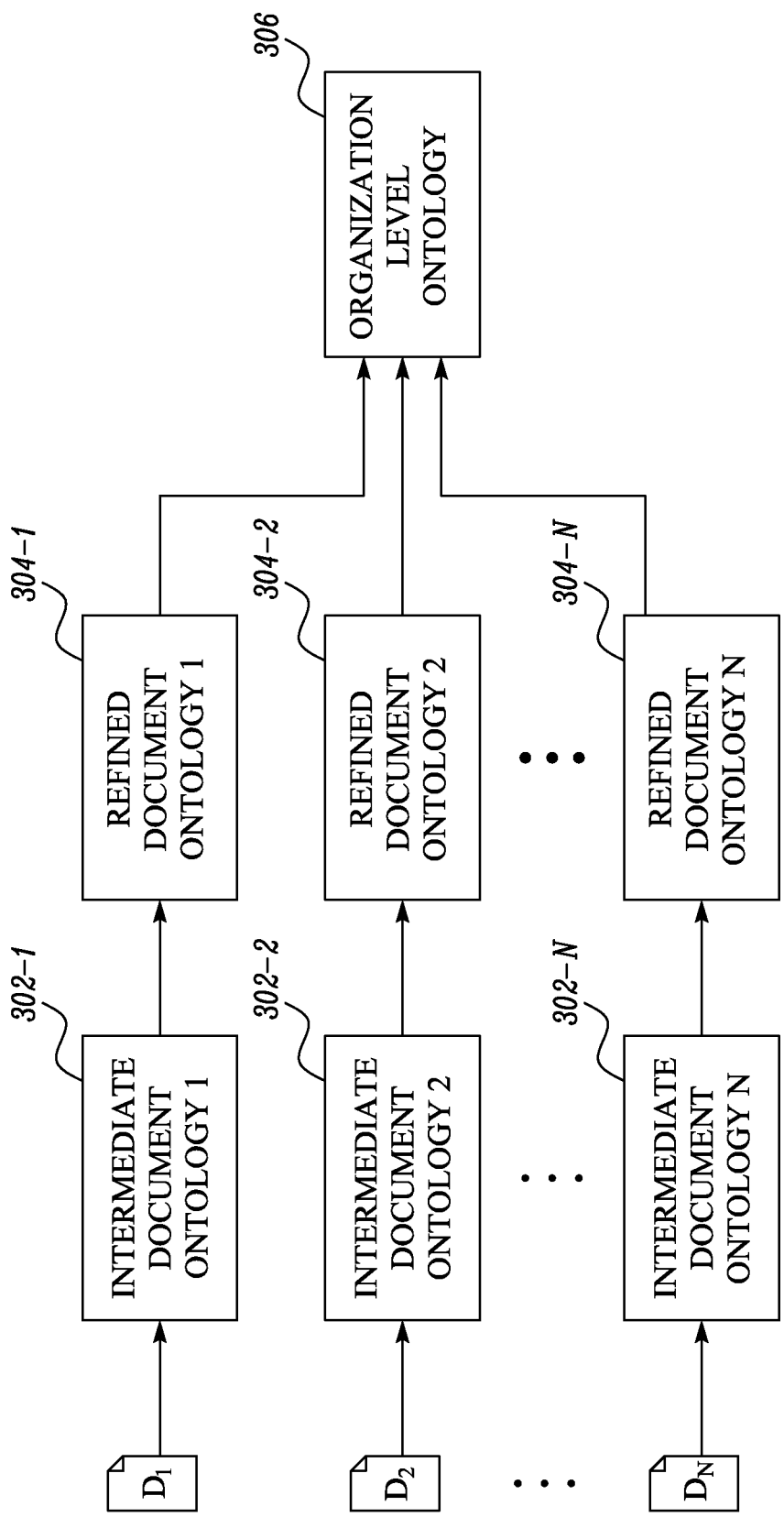
FIG. 3 illustrates an exemplary schematic representing various stages of generating the organization level ontology from one or more documents, in accordance with some embodiments.

FIG. 2 illustrates a detailed block diagram of the exemplary ontology generation system 118 of FIG. 1, in accordance with some embodiments. FIG. 3 illustrates an exemplary functional block diagram depicting various stages of generating an organization level ontology from the documents received from the document sources 104. As illustrated in FIG. 2, the ontology generation system 118 includes an extraction unit 202, a generation unit 204, an ontology assessment unit 206, an ontology refinement unit 208 and an ontology integration unit 210. In an exemplary implementation, one or more of the extraction unit 202, the generation unit 204, the ontology assessment unit 206, the ontology refinement unit 208, and the ontology integration unit 210 may be implemented within the ontology generation system processor 124. However, in an alternative implementation, these components may be implemented in a distributed computing environment with one or more components being implemented remotely, such as in a remote computing device and/or a cloud environment.

In an exemplary embodiment, the ontology generation system 118 may be configured to generate one or more intermediate document ontologies 302, such as intermediate document ontologies 302-1, 302-2 . . . 302-*n*, as shown in FIG. 3, corresponding to every document, such as, each of the documents $D_1, D_2, \ldots D_n$, received from the document sources 104. Each of these intermediate document ontologies 302 are assessed and refined to obtain a refined document ontology 304, such as the refined document ontologies 304-1, 304-2 ... 304-n, respectively. The refined document ontologies 304-1, 304-2 ... 304-n may then be integrated to form the organization level ontology 306 that represents the knowledge associated with the organization.

To this end, for every document, the extraction unit 202 may be configured to extract one or more nodes present in each document and one or more directed relationships among the extracted one or more nodes of the document. For example, the nodes may include one or more natural language concepts, entities, and/or keywords. The nodes may include, but are not limited to, names, dates, locations, which are important in a particular domain of interest, for example, for the organization, in some embodiments. The relationships connect or link two nodes. For example, consider a document that includes text "Vaccinations against Covid-19 may be accelerating in the United States". In such a document, the nodes may be identified as "Vaccination", "Covid-19", and "United States", while the directed relationships among nodes may be identified as:

United States→Contains→Covid-19
Vaccination→Against→Covid-19

The directed relationships may indicate a particular direction of the relationship between two nodes, which means the reverse direction of the relationship may not be applicable. For example, United States contains Covid-19, but the reverse is not applicable. However, in some implementations, where two nodes can be related in both directions, then in such situations, both the directed relationships are required to be identified and extracted individually.

In an embodiment, the extraction unit 202 may utilize pre-trained transformer based machine learning models for natural language processing to extract the nodes and the directed relationships from a document. In one implementation, the extraction unit 202 may be configured to utilize pre-trained off-the-shelf language models, such as bidirectional transformers (for example, Bidirectional Encode Representations from Transformers (BERT)) that are already trained to identify the nodes and the directed relationships in natural language processing. In an additional or alternative implementation, the extraction unit 202 may utilize an embeddings transformers language model for creating vectors or embeddings representing the nodes and the directed relationships within the document. The embeddings transformers language model may produce a distributed representation of words, phrases etc., by using skip grams, GloVe, word2vec, fastText, or any other vectorization technique now known or in the future developed. For example, the embeddings transformers language model may be pre-trained based on a training text corpus and the model learns a representation for the entities (words, phrases, etc.) contained in the training text corpus. In a further embodiment, the transformers based model may be configured to continually learn to enhance the identification of nodes and directed relationships, based on, and corresponding to any updates in the knowledge base of the organization and/or any new information added to the auxiliary data sources 110. In yet another embodiment, the extraction unit 202 may be configured to identify the directed relationships by using Hearst Patterns to label well-known hierarchical or taxonomic relationships among the identified nodes within the document.

In an exemplary embodiment, the received documents, including the documents $D_1, D_2 \ldots D_n$, along with the extracted nodes, the directed relationships and/or the embeddings generated for the nodes and the directed relationships may all be stored within the ontology database 108. In an alternative embodiment, the received documents, including the documents $D_1, D_2 \ldots D_N$, along with the extracted nodes, the directed relationships and/or the embeddings generated for the nodes and the directed relationships may all be stored locally within the memory unit 116.

Further, the generation unit 204 may be configured to generate an intermediate document ontology, such as one of the intermediate document ontologies 302 (shown in FIG. 3) for every document received from the document sources 104. The intermediate document ontologies 302, such as the intermediate document ontology 302-N, may be represented in the form of a directed graph including each of the extracted nodes and the directed relationships among the extracted nodes, wherein each node represents an edge while the directed relationship represents a link between two nodes in the directed graph. One example of the directed graph may be a Tree structure; however, other types of directed graphs, such as but not limited to, edge lists, linked lists, or any other type of directed graphs, may also be contemplated to build the intermediate document ontology 302-N for every document.

The ontology assessment unit 206 may be configured to perform an assessment of each of the generated intermediate document ontologies 302. In an embodiment, ontology assessment unit 206 may be configured to perform a combination of a syntactic assessment, a semantic assessment, and a pragmatic assessment of each of the generated intermediate document ontologies 302. To this end, the ontology assessment unit 206 includes a syntactic assessment unit 212, a semantic assessment unit 214 and a pragmatic assessment unit 216 configured to perform the syntactic assessment, semantic assessment, and pragmatic assessment of each of the intermediate document ontologies 302, respectively. These assessments may be configured to assess one or more of a structure, meaningfulness and/or how clear and adaptable is each of the generated intermediate document ontologies 302.

In an exemplary embodiment, the ontology assessment unit 206, including the syntactic assessment unit 212, the semantic assessment unit 214, and the pragmatic assessment unit 216, may be configured to use one or more predefined metrics for assessing the intermediate document ontology 302. For example, the ontology assessment unit 206 may be configured to use a pre-trained machine learning model that has been trained using one or more ontology libraries to define the metrics for assessing the ontologies. In one implementation, the predefined metrics may be absolute measurements having a numerical value of the metric lying between zero (0) and one (1).

The syntactic assessment unit 212 may be configured to assess the structure of an ontology, such as the generated intermediate document ontology 302-N, to determine a first quality score S1 corresponding to a syntactic richness and a syntactic structure of the intermediate document ontology 302-N. For example, an ontology defined as a tree structure may have a root node representing an organization level domain. At the same time, the branches and leaves show detailed information within that knowledge domain. Thus, the syntactic assessment unit 212 may be configured to assess the tree structure of the ontology, i.e., the intermediated document ontology 302-N in this case, to determine how detailed and structurally coherent the generated intermediate document ontology 302-N is.

In an exemplary embodiment, the syntactic assessment unit 212 may be configured to assess an ontology's structure to determine a syntactic richness score SR and a syntactic structure score SS. The syntactic richness score SR may indicate how rich and detailed is the structure of an ontology, such as the intermediate document ontology 302-N in one example. Therefore, if an ontology structure has a higher quantity of nodes connected to a particular node, the ontology may be considered more detailed and thus captures more information as compared to an ontology having a lesser quantity of nodes connected to a particular node.

In an embodiment, the syntactic richness score SR may be a function of richness R and structure S of the ontology, such as the intermediate document ontology 302-N. For example, the richness R may be a function of attribute richness AR and relation richness RR of the intermediate document ontology 302-N. The attribute richness AR may be represented as a metric ARM that is a function of classes and properties of one or more nodes within the intermediate document ontology 302-N. An attribute may be an inherent characteristic of a node that helps in describing the node, and a class may be a set of one or more nodes that may share common attributes or relations. For example, a quantity of attributes that are defined for each class may indicate both the quality of the intermediate document ontology 302-N design and the amount of information pertaining to instance data. Further, the relationship richness RR may be represented as a metric RRM that may be a function of properties and relationships within the ontology, such as the intermediate document ontology 302-N. The relationship richness RR may indicate the diversity of the types of relations in the ontology, such as the intermediate document ontology 302-N. As will be appreciated by a person skilled in the art, an ontology that contains only inheritance relationships usually conveys less information than an ontology that contains a diverse set of relationships, including inheritance as well as non-inheritance relationships. In some implementations, the syntactic richness score SR may be a mathematical average of an Attribute richness metric ARM and the relation richness metric RRM.

Further, the syntactic structure score SS may indicate how structurally coherent and easy to parse an ontology is, such as the intermediate document ontology 302-N in one example. In some implementations, a tree-structured ontology may be considered to have a higher structural coherence and hence may be easier to parse to retrieve information when compared to a simple edge or linked list form of ontology. However, in other implementations, as desired, any other form of the ontology may be considered to have higher structural coherence, to achieve similar results. In an exemplary embodiment, the syntactic assessment unit 212 may be configured to determine the syntactic structure score SS as a function of a total quantity or count of nodes CN and a quantity or count of root nodes CR present within the ontology, such as the intermediate document ontology 302-N.

In an embodiment, the syntactic assessment unit 212 may be configured to generate the first quality score S1 based on the syntactic richness score SR and the syntactic structure score SS for each of the intermediate document ontologies 302-N. For example, the first quality score S1 may be a mathematical average of the syntactic richness score SR and the syntactic structure score SS. However, in other implementations, the first quality score S1 may have any other type of relation to the syntactic richness score SR and the syntactic structure score SS, such as being a weighted function of the two scores, to achieve similar results without deviating from the scope of the claimed subject matter.

Further, the semantic assessment unit 214 may be configured to perform a semantic assessment to assess the accuracy and clarity of an ontology, such as the intermediate document ontology 302-N and determine a second quality score S2 corresponding to a semantic precision and a semantic variance of the generated intermediate document ontology 302-N. For example, the nodes and the directed relationships within the generated intermediate document ontology 302-N may be assessed to check whether the ontology can be understood and if the nodes and relationships are consistent within the well-known knowledge and/or previously curated knowledge, such as that curated by the organization, existing in the particular domain to which the ontology belongs.

For example, the semantic assessment unit 214 may be configured to assess the ontology's meaningfulness, accuracy, and clarity, to generate a semantic precision score SP and a semantic variance score SV. The semantic precision score SP may be configured to indicate the precision and accuracy with which the ontology, such as the generated intermediate document ontology 302-N in one example, has captured the knowledge. For example, the words/terms used within the intermediate document ontology 302-N have to be understood and the knowledge provided by the intermediate document ontology 302-N is required to be correctly mapped onto previously curated concepts existing in the specific knowledge domain to which the intermediate document ontology 302-N belongs. In some embodiments, the semantic assessment unit 214 may be configured to assess whether the nodes as well as the directed relationships are understandable and are accurate. To this end, the semantic assessment unit 214 may be configured to utilize data from one or more auxiliary data sources 110, such as, but not limited to, Wikidata, to check the precision and accuracy of the nodes and directed relationships included within the intermediate document ontology 302-N and that they are meaningful and understandable. In some other embodiments, the semantic assessment unit 214 may be configured to use a machine learning model that is pre-trained based on external and independent knowledge resources to understand the accuracy of the ontologies, i.e., the intermediate document ontology 302-N in this example. For example, when the intermediate document ontology 302-N states that A is a subset of B, whereas information received from the auxiliary data sources 110 or other knowledge resources indicate that B is a subset of A, then the information captured by the intermediate document ontology 302-N is determined to be inaccurate and hence will have a lower semantic precision score SP. Similarly, if the concepts captured in the intermediate document ontology 302-N are consistent with the knowledge received from the other knowledge resources, such as the auxiliary data sources 110, then such intermediate document ontology 302-N will have a higher semantic precision score SP.

In some implementations, the semantic precision score SP may be calculated as a function of the quantity or count of nodes mapped to one or more keywords and the total quantity or count of nodes CN present in the intermediate document ontology 302-N. For example, the semantic assessment unit 214 may be configured to extract one or more keywords present in the intermediate document ontology 302-N and map the terms of each node with the keywords and count all the nodes that have at least one keyword present in their names. Therefore, based on the determined count of nodes mapped to keywords and the total quantity of nodes present in the intermediate document ontology 302-N, the semantic assessment unit 214 may be configured to determine the semantic precision score SP.

Further, the semantic variance score SV may indicate how spread out is the ontology, such as the intermediate document ontology 302-N, in capturing the knowledge. The semantic variance score SV may indicate the degree of dispersion of concepts modeled in the intermediate document ontology 302-N with respect to a center of the knowledge structure (such as the root node) of that intermediate document ontology 302-N. In an exemplary implementation, for a given ontology (such as the intermediate document ontology 302-N), the semantic variance score SV may be determined as a function of the semantic distance between each node and the root node, a depth and a breadth of the intermediate document ontology 302-N. As will be appreciated, the depth of an ontology may correspond to an average depth of any of the terminal nodes present within the ontology, whereas the breadth may correspond to an average quantity of nodes present at any particular level of the ontology.

The semantic assessment unit 214 may further be configured to generate the second quality score S2 as a function of the semantic precision score SP and the semantic variance score SV of each of the intermediate document ontology 302-N. For example, the second quality score S2 may be a mathematical average of the semantic precision score SP and the semantic variance score SV. However, in other implementations, the second quality score S2 may have any other type of relation to the semantic precision score SP and the semantic variance score SV, such as being a weighted function of the two scores, to achieve similar results.

In an exemplary embodiment, the pragmatic assessment unit 216 may be configured to perform a pragmatic assessment of an ontology, such as the generated intermediate document ontology 302-N to determine a third quality score S3 corresponding to the clarity and adaptability of the intermediate document ontology 302-N. For example, the pragmatic assessment unit 216 may be configured to determine the ambiguity in the meaning or representations of the nodes and/or the directed relationships within the generated intermediate document ontology 302-N. Further, the pragmatic assessment unit 216 may also determine how adaptable an ontology, i.e., the intermediate document ontology 302-N in this example, is. In other words, the pragmatic assessment unit 216 may also determine how well the intermediate document ontology 302-N can adapt to incorporate any new or additional information.

To this end, the pragmatic assessment unit 216 may be configured to perform an assessment on the terms used in the ontology, such as the intermediate document ontology 302-N. For example, the pragmatic assessment unit 216 may be configured to determine whether the intermediate document ontology 302-N includes ambiguous terms or closely related terms. Examples of ambiguous terms may include but are not limited to terms having more than one meaning, abbreviations, pronouns, and so on. Thus, an ontology having a greater quantity of ambiguous terms may have a lower pragmatic clarity score than an ontology having a minimal or zero quantity of ambiguous terms. In some embodiments, the pragmatic assessment unit 216 may also be configured to detect one or more vague terms present within the intermediate document ontology 302-N. For example, a vague term may be a term that consists of one or more words being an adjective or an adverb. The pragmatic assessment unit 216 may be configured to identify one or more nodes as well as relationships of the intermediate document ontology 302-N that include one or more vague terms.

For this, the pragmatic assessment unit 216 may be configured to determine one or more definitions of each term T present in the one or more nodes as well as the relationships within the intermediate document ontology 302-N and further determine a count of definitions CD determined for every term T. In one example, the pragmatic assessment unit 216 may be configured to compute a nodes clarity metric NC as a function of the definitions of terms present in the nodes and a relationship clarity metric RC as a function of the definitions of terms present in the directed relationships present with an ontology (for example, the intermediate document ontology 302-N). In an exemplary implementation, the pragmatic assessment unit 216 may be configured to determine a pragmatic clarity score PC as a function of the nodes clarity metric NC and the relationship clarity metric RC. The pragmatic clarity score PC may indicate how clear the terms used in the one or more nodes and the directed relationships of the intermediate document ontology 302-N are.

In some implementations, the pragmatic assessment unit 216 may use data or information received from external data resources, such as the auxiliary data sources 110, to extract the definitions associated with every term and determine if the intermediate document ontology 302-N includes any ambiguous terms and/or vague terms. In some other implementations, the pragmatic assessment unit 216 may use pre-trained machine learning models that have been trained based on external and independent knowledge resources. In some embodiments, the pragmatic assessment unit 216 may use a coreference resolution technique, a direct string matching technique, a fuzzy string matching technique, or any other techniques now known or in the future developed, to determine similarities or ambiguities between terms and nodes within the intermediate document ontology 302-N.

Further, the pragmatic assessment unit 216 may be configured to perform an assessment on the ontology, such as the intermediate document ontology 302-N, to determine the adaptability of the intermediate document ontology 302-N and accordingly determine a pragmatic adaptability score PA. In an embodiment, the pragmatic assessment unit 216 may be configured to assess the depth and breadth of the knowledge represented by the intermediate document ontology 302-N and accordingly generate the pragmatic adaptability score PA. The pragmatic adaptability score PA may indicate how easily the generated intermediate document ontology 302-N can accommodate new documents and information, such as those received from one or more document sources 104 and/or the auxiliary data sources 110. For example, an intermediate document ontology 302-N that includes a greater quantity of nodes covering detailed knowledge and where every node is well and unambiguously connected with other nodes, will have higher adaptability to include any additional or new information or document. This means that a greater quantity of nodes and directed relationships connecting those nodes within an ontology, such as the intermediate document ontology 302-N may indicate a higher possibility of having at least one common node within the intermediate document ontology 302-N that may also represent at least one concept within a new document or information intended to be integrated to the intermediate document ontology 302-N. Thus, using such a common node, the new document or information may be added to the existing intermediate document ontology 302-N. Such an ontology may be considered to be more adaptable or have a high adaptability score. In contrast, for a basic ontology with only a few nodes and/or missing connections, any new document or information will not have an identifiable node in the ontology to which it can be connected to. Thus, such an ontology may be considered as not adaptable or having lower adaptability for incorporating new information or knowledge.

To this end, in some exemplary embodiments, the pragmatic assessment unit 216 may be configured to determine the depth of each node within the ontology, such as the intermediate document ontology 302-N. For example, a depth of a node may be the quantity of edges from the node to the root node. Thus, a root node will have a depth of 0. Additionally, the pragmatic assessment unit 216 may also determine the total quantity or count of leaf nodes CL present within the intermediate document ontology 302-N. For example, a leaf node may be defined as a terminal node of an ontology that does not have any outgoing directed relationship with any other node in the ontology. In an embodiment, the pragmatic assessment unit 216 may be configured to determine the pragmatic adaptability score PA for the intermediate document ontology 302-N as a function of the count of leaf nodes CL and a depth of the leaf nodes within the intermediate document ontology 302-N.

In an exemplary embodiment, the pragmatic assessment unit 216 may be configured to generate the third quality score S3, as a function of the determined pragmatic clarity score PC and the pragmatic adaptability score PA of each of the intermediate document ontology 302-N. For example, the third quality score S3 may be a mathematical average of the pragmatic clarity score PC and the pragmatic adaptability score PA. However, in other implementations, the third quality score S3 may have any other type of relation to the pragmatic clarity score PC and the pragmatic adaptability score PA, such as being a weighted function of the two scores, to achieve similar results without deviating from the scope of the claimed subject matter.

The ontology assessment unit 206 may further be configured to determine an overall quality score S for each of the generated intermediate document ontology 302-N. In an embodiment, the overall quality score S may be based on the first quality score S1, the second quality score S2, and the third quality score S3 determined by the syntactic assessment unit 212, the semantic assessment unit 214, and the pragmatic assessment unit 216. For example, the overall quality score S may be a mathematical average of the first quality score S1, the second quality score S2, and the third quality score S3. The overall quality score S is thus representative of the overall quality of the respective intermediate document ontology 302-N with respect to its structural and semantic accuracy, robustness, and coherence as well as its pragmatic usefulness and adaptability.

Further, the ontology refinement unit 208 may be configured to refine the intermediate document ontology 302-N to generate a respective refined document level ontology 304-N, as shown in FIG. 3. In an exemplary embodiment, the refined document level ontology 304-N is optimized to satisfy one or more quality metrics. For example, the intermediate document ontology 302-N may be refined to enhance the overall quality score S by improving one or more of the first quality score S1 (including the syntactic richness score SR and syntactic structure score SS), the second quality score S2 (including the semantic precision score SP and the semantic variance score SV) and the third quality score S3 (including the pragmatic clarity score PC and the pragmatic adaptability score PA). In some implementations, the ontology refinement unit 208 may be configured to iteratively refine every intermediate document ontology 302-N until the overall quality score S of the refined document level ontology 304-N is greater than a threshold value T.

In an exemplary embodiment, the ontology refinement unit 208 may receive one or more auxiliary data, via the I/O unit 114, from the one or more auxiliary data sources 110 (as shown in FIG. 1) associated with the nodes as well as the directed relationships within the intermediate document ontology 302-N and refine the intermediate document ontology 302-N based on the information within the auxiliary data. As described hereinbefore, the auxiliary data sources 110 may include any external and/or independent knowledge resource(s), such as Wikidata, Wikipedia, DBpedia, or other knowledge resources available on the Internet that may provide any additional information about the documents (such as the documents received from the document sources 104), the nodes and/or the directed relationships extracted from these documents. The ontology refinement unit 208 may be configured to use such auxiliary data to refine the intermediate document ontology 302-N.

To this end, the ontology refinement unit 208 includes a disambiguation unit 218, an enrichment unit 220, and a taxonomic expansion unit 222. The disambiguation unit 218 may be configured to disambiguate the intermediate document ontology 302-N to reduce the quantity of duplicate nodes and generate a disambiguated document ontology (hereinafter referred to as first stage refined document ontology). The disambiguation unit 218 may determine one or more redundancies in the intermediate document ontology 302-N and merge all the nodes that have or indicate the same meaning. For example, the disambiguation unit 218 may be configured to identify one or more aliases, from the one or more auxiliary data, for the nodes within the intermediate document ontology 302-N and accordingly merge all the nodes having common aliases. For example, "United States", "US", "United States of America" and "USA" may be determined to be aliases of one another and hence may be merged into a single node. Similarly, "Covid-19" or "SARS-CoV-2" may be determined to be aliases and hence may be merged to a single node.

Further, the disambiguation unit 218 may use a coreference resolution technique to identify the ambiguous terms within the intermediate document ontology 302-N and merge them into one node to disambiguate the intermediate document ontology 302-N. In some examples, the nodes, such as those representing nouns or pronouns referring to the same entity, may also be merged. For example, in a statement "People should get their vaccination to keep themselves sale", the terms "people", "their" and "themselves" may be determined to refer to the same entity, "people", hence these nodes may be merged into a single node. Furthermore, the disambiguation unit 218 may use fuzzy string matching to determine one or more nodes that are similar to one another and merge all these nodes into a single node. For example, the term "vaccine" may be determined to be similar to the term "vaccines", and thus, these two nodes may be merged into a single node. In additional or alternative embodiments, the disambiguation unit 218 may be configured to use one or more pre-trained transformer based machine learning models for natural processing, such as the bidirectional transformers, embedding transformers language models to find similarities between nodes that can be merged together.

Further, the enrichment unit 220 may be configured to utilize the auxiliary data, received from the one or more auxiliary data sources 110, to determine one or more context based relationships between the one or more nodes present within the first stage refined document ontology. For example, consider that the first stage refined document ontology includes the following nodes and relationships:

United States→Contains→Covid-19
Vaccination→Against→Covid-19

Further, the auxiliary data, received from one or more auxiliary data sources 110, indicates that "United States is accelerating the vaccination against Covid-19". Thus, based on this auxiliary data, the enrichment unit 220 may be configured to identify a context based relation between the nodes "United States" and "Vaccination", which is the directed relationship "accelerates". Therefore, the enrichment unit 220 may identify the new directed relationship as:

United States→Accelerates→Vaccination

In an exemplary embodiment, the enrichment unit 220 may be configured to use context analysis techniques known in natural language processing to break down the sentences in any document into n-grams and noun phrases to identify context based relationships between nodes. In some other implementations, the enrichment unit 220 may use one or more pre-trained transformer based machine learning models for natural processing, such as the bidirectional transformers, embedding transformers language models to find context based relationships between the nodes.

Further, the enrichment unit 220 may be configured to refine the intermediate document ontology 302-N to generate an enriched document ontology. For example, the enrichment unit 220 may be configured to refine further the first stage refined document ontology (such as the disambiguated document ontology) to generate the enriched document ontology (hereinafter referred to as a second stage refined document ontology). The enrichment unit 220 may be configured to include one or more context based relationships in the first stage refined document ontology, thereby generating the second stage refined document ontology.

In an embodiment, the taxonomic expansion unit 222 may be configured to further enhance the second stage refined document ontology by taxonomically expanding every node in the existing second stage refined document ontology. The taxonomic expansion unit 222 may be configured to further refine the second stage refined document ontology by adding one or more additional nodes and one or more supplemental directional relationships between the additional nodes and the existing nodes to the second stage refined document ontology. For example, the one or more additional nodes may include nodes that are taxonomically and hierarchically linked to an existing node of the ontology. In an implementation, the taxonomic expansion unit 222 may be configured to query or extract one or more additional nodes and one or more supplemental directional relationships between the additional nodes and the existing nodes, from the one or more auxiliary data sources 110, using one or more of querying, web scraping, web crawling or any other techniques now known or in the future developed. For example, continuing from the previously described example, one or more auxiliary data sources 110 may indicate the following additional information about the existing nodes "United States" and "Covid-19" of the second stage ontology:

United States→is an instance of→Country→is a subset of→Territorial Entity Type;
Covid-19→is an instance of→Atypical Pneumonia→is a subset of→Disease In the above example, the nodes "Country", and "Territorial Entity Type" are determined to be taxonomically or hierarchically linked to the existing node "United States" in the second stage refined document ontology. Similarly, the nodes "Atypical Pneumonia" and "Disease" are determined to be taxonomically linked to the existing node "Covid-19" within the second stage refined document ontology. Similarly, the directed relationships "is a subset of", "is an instance of" may be identified as one or more supplemental directional relationships between the additional nodes and the existing nodes of the second stage refined document ontology. In some implementations, similar to the other units, the taxonomic expansion unit 222 may also be configured to use one or more pre-trained transformer based machine learning models for natural processing, such as the bidirectional transformers, embedding transformers language models to identify the one or more additional nodes and the supplemental directional relationships between the additional nodes and the existing nodes of the ontology, such as the second stage refined ontology.

The taxonomic expansion unit 222 may further be configured to add all the identified taxonomically linked nodes and the supplemental directional relationships to the second stage refined document ontology to generate a third stage refined document ontology, which may be considered as the final refined document ontology 304-N (as shown in FIG. 3) for a document. Thus, the final refined document ontology 304-N may be configured to be a directed graph, such as a tree structure, including the disambiguated and enriched information about nodes and their relationships with one another and also includes all the taxonomically expanded information about the nodes available not only in the documents received from the document sources 104 but also from other external and independent knowledge resources, such as the ones available via the Internet.

In an exemplary embodiment, the first stage refined document ontology, the second stage refined document ontology as well as the third stage refined document ontology may be assessed by the ontology assessment unit 206 until the refined document ontology, such as the third stage refined document ontology, in this case, satisfies a threshold quality score. For example, at every stage of refinement, the ontology assessment unit 206 may be configured to determine the overall quality score S of the ontology, such as by determining each of the first quality score S1 (including the syntactic richness score SR and syntactic structure score SS), the second quality score S2 (including the semantic precision score SP and the semantic variance score SV) and the third quality score S3 (including the pragmatic clarity score PC and the pragmatic adaptability score PA), in a similar manner as described above.

In an exemplary implementation, once the taxonomic expansion is performed, the refined document ontology 304-N will include a more detailed, accurate, clear, and unambiguous representation of the knowledge in the respective knowledge domain of the respective document. The refined document ontology 304-N, therefore, is structurally coherent and robust, includes greater details of a particular knowledge domain corresponding to the document, and is semantically accurate and precise. Further, the refined document ontology 304-N also possesses a higher pragmatic quality, which means the ontology is highly usable, unambiguous, and adaptable to incorporate any changes to the knowledge domain represented in the ontology.

It may be contemplated that for the purposes of simplicity, the refined document ontology 304-N obtained after the taxonomic expansion is considered to satisfy the quality metric and hence is considered as the final refined document ontology 304-N for a respective document. However, it may be understood by those skilled in the art that the entire process of ontology assessment and ontology refinement may be an iterative process to continually enhance the document ontology, for example, in light of any new information available via the auxiliary data sources 110, in connection to one or more nodes within the refined document ontology 304-N. In some embodiments, for the purposes of iterative enhancement of document ontology, the ontology generation system 118 may be configured to continually scan the one or more auxiliary data sources 110 and monitor if any additional or updated information is available that may be relevant and/or necessary to incorporate into the existing document ontology. If such information is encountered and extracted, it can be easily incorporated into the existing ontology due to the high adaptability of the ontology.

Further, the ontology integration unit 210 may be configured to generate an organization level ontology, such as the organization level ontology 306 (as shown in FIG. 3), based on the refined document ontology 304-N generated for all the documents received from the document sources 104 within the organization, for example. In an exemplary embodiment, the ontology integration unit 210 may be configured to link the individually refined document ontologies, such as the refined document ontologies 304-1, 304-2 . . . 304-N, corresponding to each of the plurality of documents, with one another to generate the organization level ontology 306. To accomplish this, the ontology integration unit 210 may be configured to identify one or more nodes that are common in, for example, two refined document ontologies 304, for example, 304-1, 304-2. Using the one or more common nodes as joining points in the first refined document ontology 304-1, the second refined document ontology 304-2 is integrated with the first refined document ontology 304-1 to generate the organization level ontology. Similarly, one or more common nodes in the generated organization level ontology and a third refined document ontology 304-3 may be identified, and the third refined document ontology 304-3 is integrated using these common nodes as the joining points. It may be contemplated that all the refined document ontologies 304 corresponding to the plurality of documents may be integrated in a similar manner to form the organization level ontology 306. In an exemplary embodiment, the organization level ontology 306 is also a directed graph including nodes and directed relationships among the nodes, wherein each node represents an edge while the directed relationship represents a link between two nodes in the directed graph. One example of the directed graph is a tree structure; however, other types of directed graphs may also be contemplated without deviating from the scope of the claimed subject matter.

As described previously herein, each of the plurality of documents, the extracted nodes, the directed relationships, the embeddings corresponding to the extracted nodes and the directed relationships, as well as the generated intermediate document ontologies 302-N, the refined document ontologies 304-N (including the multiple stages of refined document ontologies) and the organization level ontology 306 are all stored, for example in the ontology database 108, as shown in FIG. 1. Additionally, each of the plurality of documents is indexed to be appropriately linked to all the applicable nodes within the organization level ontology 306 and stored, such as within the ontology database 108 for efficient knowledge retrieval.

Figure 4:
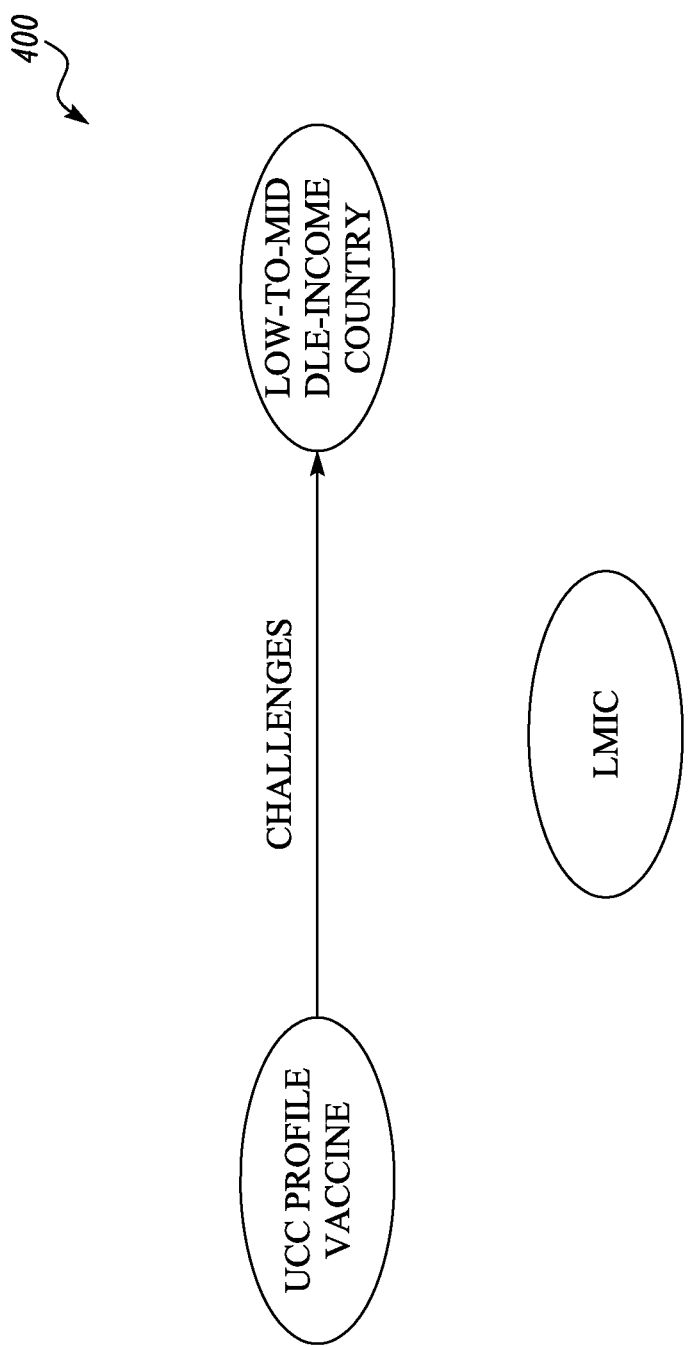
FIG. 4 illustrates an exemplary intermediate document ontology generated for a first document, in accordance with some embodiments.

FIGS. 4 through 12 illustrate the various stages of ontologies generated by the ontology generation system 118, in accordance with some embodiments. FIG. 4 illustrates an exemplary first intermediate document ontology 400 for a document D1. The first intermediate document ontology 400, for example, may be one of the intermediate document ontologies 302-N.

For example, consider a document D1 that includes the following information:

"Vaccines with ultra-low temperature cold chain (UCC) profile pose several challenges for many low-to-middle—income countries (LMIC) because of the lank of existing UCC within their health/immunization systems"

For the above document D1 the extraction unit 202 may extract the following nodes and directed relations:

UCC profile vaccines→challenges→Low-to-middle-income-countries;

LMIC

Based on the output of the extraction unit 202, the generation unit 204 may generate the first intermediate document ontology 400 including the extracted nodes and the directed relationships. As illustrated, the node LMIC does not have any directed relationship with the other nodes of the document. The generated first intermediate document ontology 400 is assessed by the ontology assessment unit 206 to generate a first overall score SC1 based on the combination of syntactic assessment, semantic assessment, and the pragmatic assessment. As illustrated, the generated intermediate document ontology 400 includes only a few nodes and one or more nodes that are not linked to any other nodes in the ontology. Thus, the generated first intermediate document ontology 400 will possess a low quality score SC1.

Figure 5:
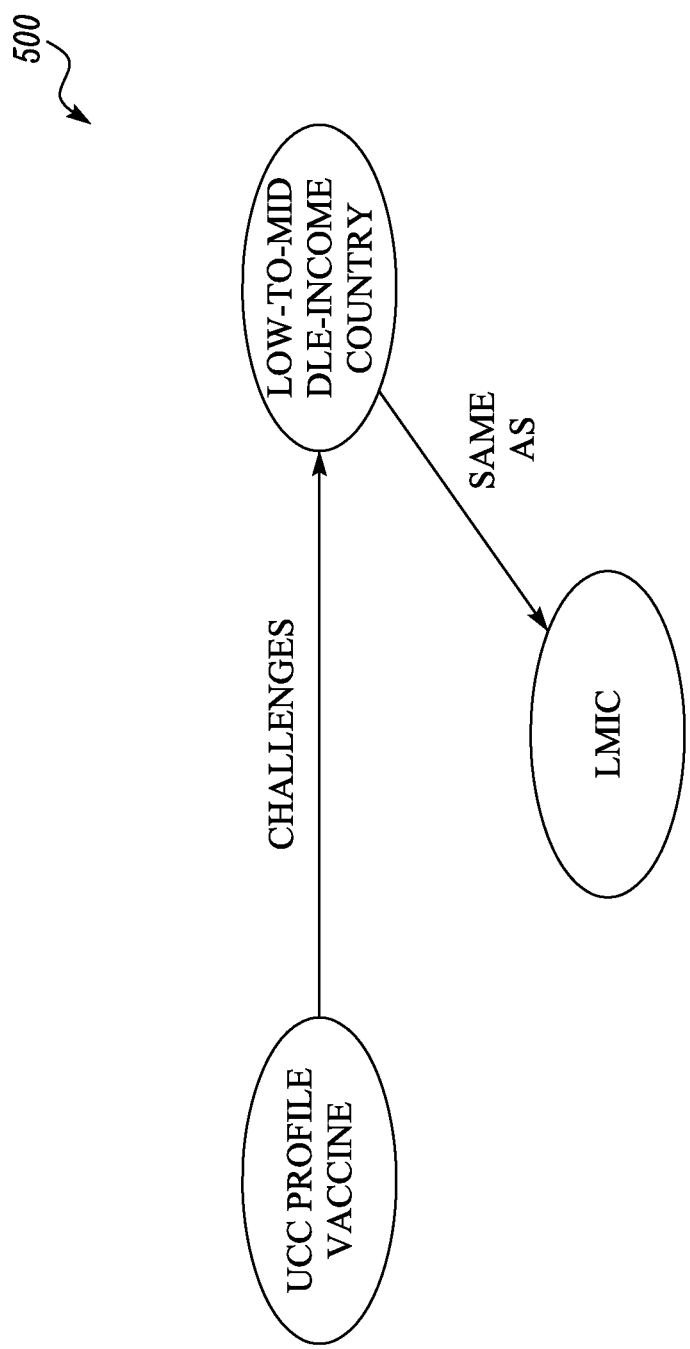
FIGS. 5 through 7 illustrate exemplary refined document level ontologies corresponding to the first document, in accordance with some embodiments.

The generated intermediate document ontology 400 for document D1 is then refined to enhance the overall quality score of the ontology. FIG. 5 illustrates an exemplary first stage refined document ontology 500 obtained from the first intermediate document ontology 400 for the document D1. For example, the disambiguation unit 218 may be configured to identify aliases and/or any other ambiguity existing within the intermediate document ontology 400. As shown, the node "LMIC" is determined to be the same as "low-to-middle-income-countries". Thus, the disambiguation unit 218 may merge these two nodes into a single node to remove the duplication within the ontology.

Figure 6:
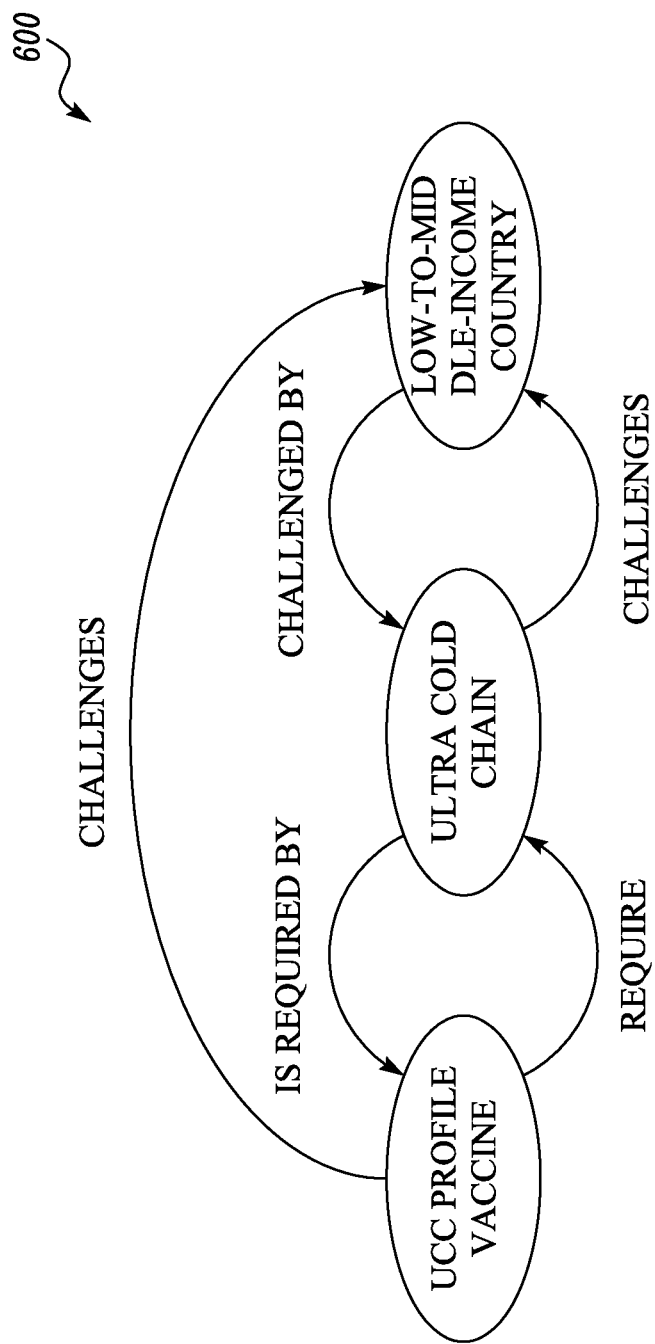

Further, the enrichment unit 220 may be configured to extract one or more context based relationships among the nodes of the first stage refined document ontology 500 from one or more auxiliary data sources 110 available on the Internet. FIG. 6 illustrates an exemplary second stage refined document ontology 600 obtained from the first stage refined document ontology 500 for document D1. As shown, the first stage refined document ontology 500 may be enriched with additional context based directed relationships among the existing nodes. For example, as shown, the second stage refined document ontology 600 may include the following additional directed relationships:

UCC profile vaccines→challenges→Low-to-middle-income-countries

UCC profile vaccines→require→Ultra Cold Chain

Ultra Cold Chain→is required by→UCC vaccine profile

Ultra Cold Chain→challenges→Low-to-middle-income-countries

Low-to-middle-income-countries→challenged by→Ultra Cold Chain

As shown, the generated second stage refined document ontology 600 includes more detailed information as compared to the first stage refined document ontology 500, and hence, may possess a relatively higher quality score as compared to that of the first stage refined document ontology 500.

Figure 7:
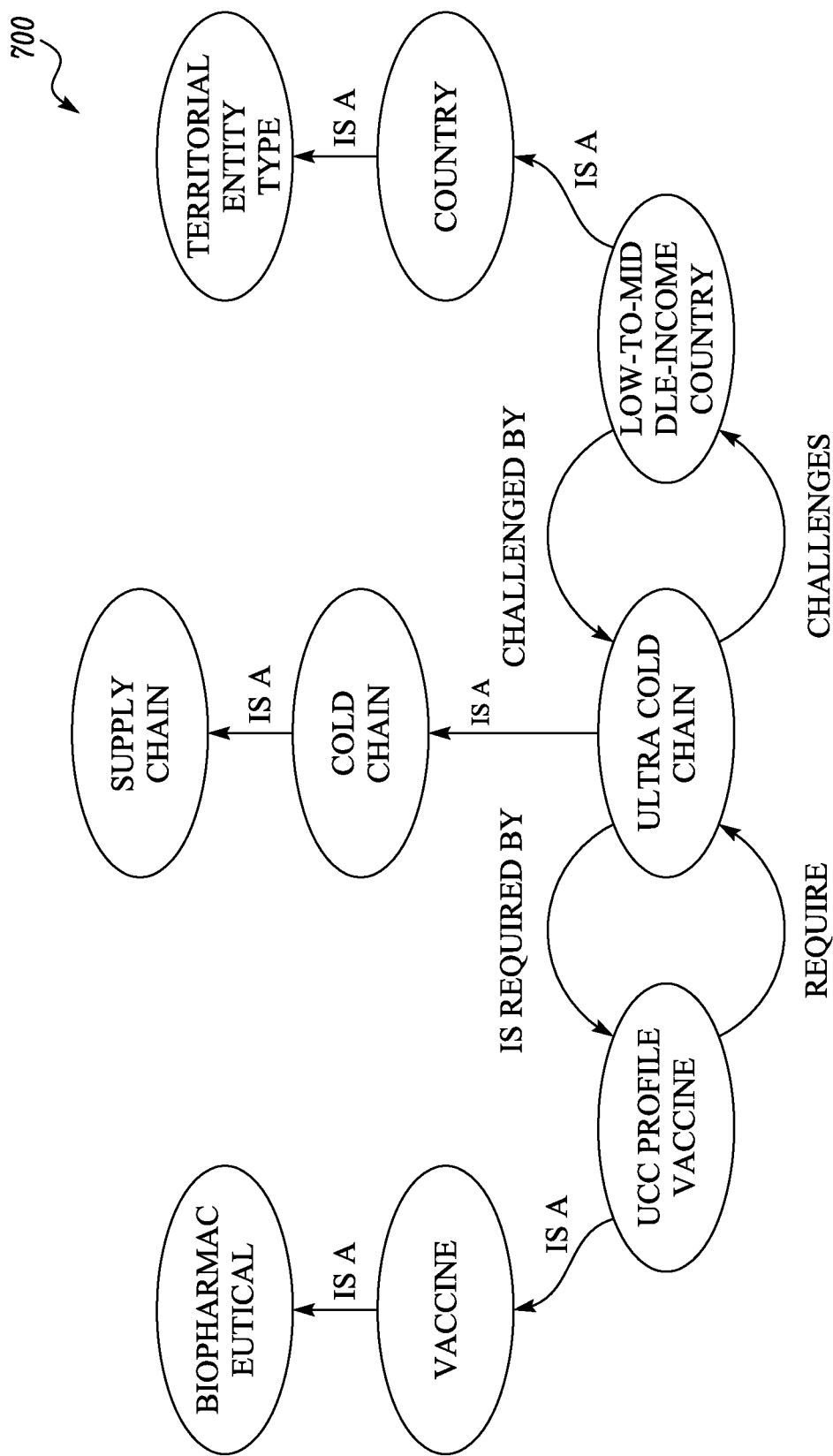

Furthermore, the taxonomic expansion unit 222 may be configured to extract one or more additional nodes and supplemental directional relationships among the additional nodes and the existing nodes of the second stage refined document ontology 600, such as from the one or more auxiliary data sources 110 available via the Internet. As described previously herein, the one or more additional nodes may be the ones that are taxonomically or hierarchically linked to the existing nodes of the second stage refined document ontology 600. FIG. 7 illustrates an exemplary third stage refined document ontology 700 obtained from the second stage refined document ontology 600 for the document D1, including the additional nodes and supplemental directional relationships among the additional nodes and the existing nodes.

For example, the taxonomic expansion unit 222 may identify the nodes "Vaccine" and "Biopharmaceutical" taxonomically linked to the existing node "UCC Profile Vaccine". Similarly, the additional nodes "Cold Chain" and "Supply Chain" may be identified as taxonomically linked to the existing node "Ultra Cold Chain". Furthermore, the additional nodes "Country" and "Territorial Entity Type" may be identified as taxonomically linked to the existing node "Low-to-Middle-Income Country". Additionally, the taxonomic expansion unit 222 may identify the supplemental directional relationships to be "is a", as linking the additional nodes to the existing nodes. Thus, the taxonomic expansion unit 222 generates the third stage refined document ontology 700 for document D1 by including all the additional nodes and the supplemental directional relations therein.

The generated third stage refined document ontology 700 may also be assessed by the ontology assessment unit 206 to determine the updated overall quality score SC1 based on the combination of syntactic assessment, semantic assessment, and the pragmatic assessment. In the illustrated example, the third stage refined document ontology 700 may be considered optimized to satisfy the intended quality metric and thus, may be determined to have an overall quality score SC1 greater than a threshold value. The generated third stage refined document ontology 700 may then be stored as the refined document ontology 700 for the document D1, such as in the ontology database 108. The refined document ontology 700, for example, may be one of the refined document ontologies 304-N.

Similarly, consider an exemplary document D2 that includes the following information:

"Countries should explore the ability of logistic service providers to support the deployment of the ultra-low temperature cold chain (UCC) equipment."

Figure 8:
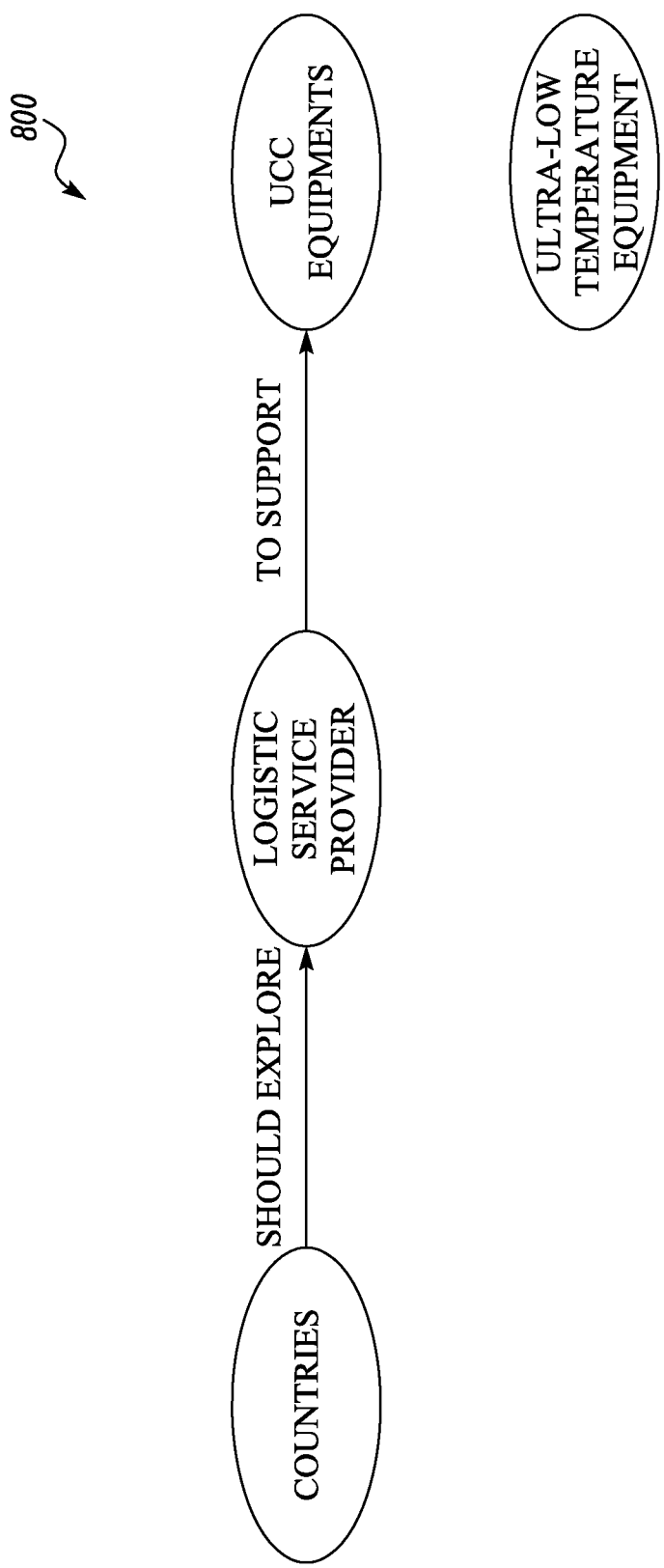
FIG. 8 illustrates an exemplary intermediate document ontology generated from a second document, in accordance with some embodiments.

For the above document D2, the extraction unit 202 may extract the following nodes and directed relations:

Countries→should explore→Logistic Service Providers→to support→UCC Equipment;
Ultra-low temperature equipment Based on the output of the extraction unit 202, the generation unit 204 may generate an exemplary second intermediate document ontology 800 for document D2 including the extracted nodes and the directed relationships, as shown in FIG. 8. As illustrated, the node "Ultra-low temperature equipment" does not have any directed relationship with the other nodes of the document. The generated second intermediate document ontology 800 for document D2 may be assessed by the ontology assessment unit 206 to generate a second overall score SC2 based on the combination of syntactic assessment, semantic assessment, and the pragmatic assessment. As illustrated, the generated second intermediate document ontology 800 includes only a few nodes and one or more nodes that are not linked to any other nodes in the ontology. Thus, the generated second intermediate document ontology 800 for document D2 will possess a low quality score SC2.

Figure 9:
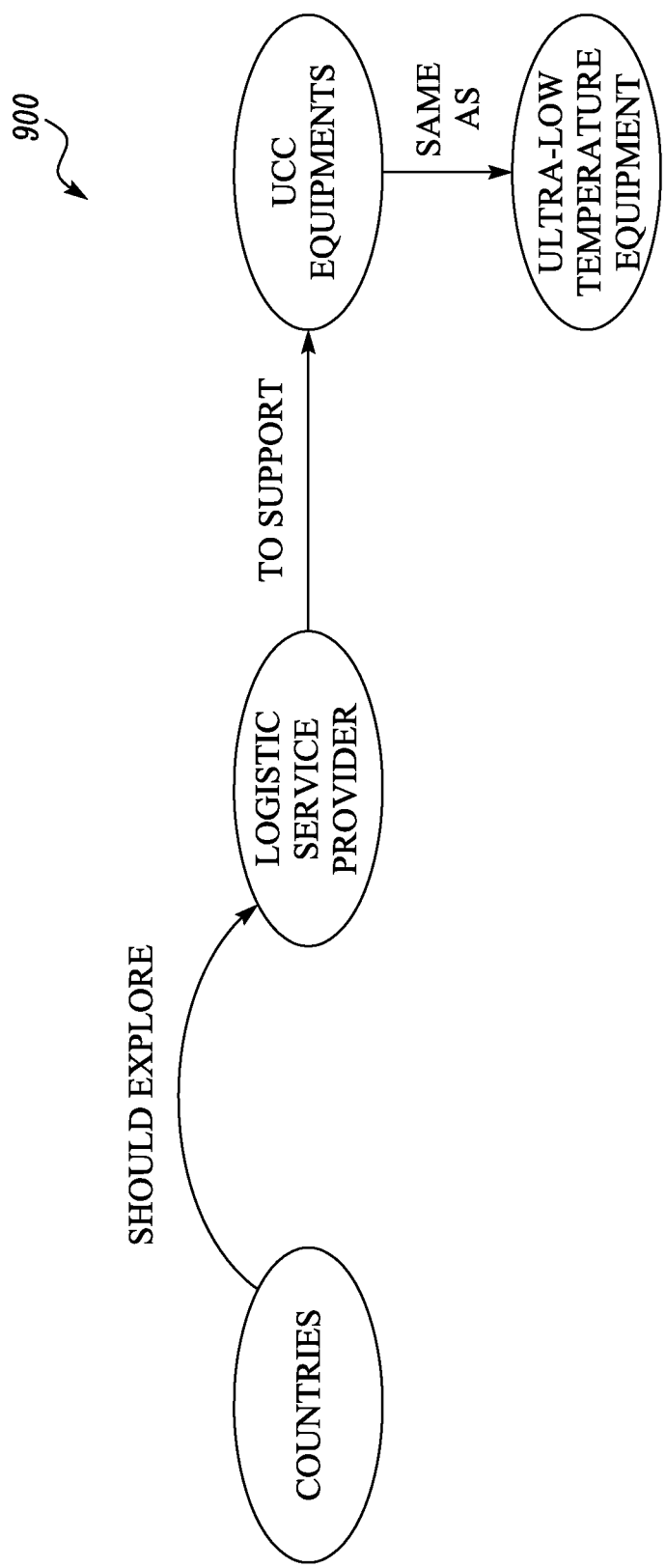
FIGS. 9 through 11 illustrate exemplary refined document level ontologies corresponding to the second document, in accordance with some embodiments.

The generated second intermediate document ontology 800 for document D2 may then be refined to enhance the overall quality score of the ontology. FIG. 9 illustrates an exemplary first stage refined document ontology 900 obtained from the second intermediate document ontology 800 for document D2. For example, the disambiguation unit 218 may be configured to identify aliases and/or any other ambiguity existing within the second intermediate document ontology 800. As shown, the node "Ultra-low temperature equipment" is determined to be the same as "UCC Equipment". Thus, the disambiguation unit 218 may merge these two nodes into a single node to remove the duplication within the second intermediate document ontology 800.

Figure 10:
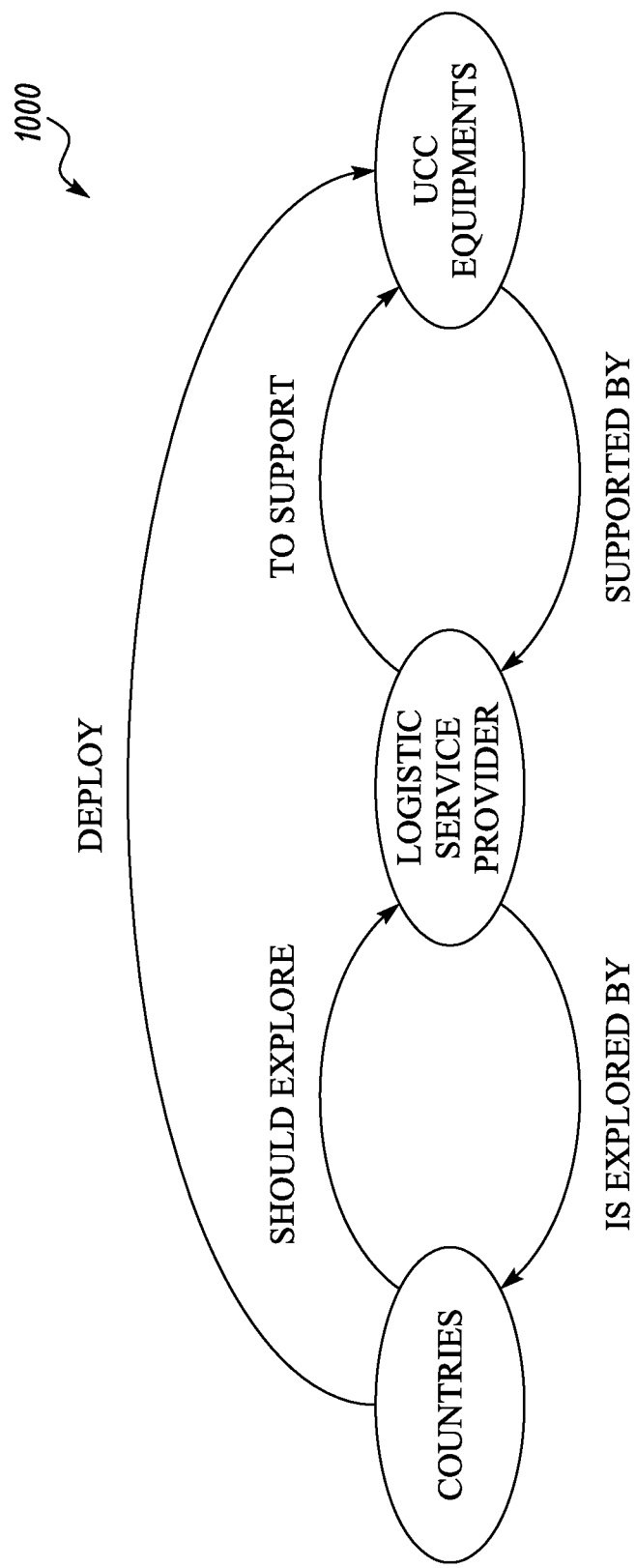

Further, the enrichment unit 220 may be configured to extract one or more context based relationships among the nodes of the first stage refined document ontology 900 for document D2, from one or more auxiliary data sources 110 available via the Internet. FIG. 10 illustrates an exemplary second stage refined document ontology 1000 obtained from the first stage refined document ontology 900 for document D2. As shown, the first stage refined document ontology 900 may be enriched with additional context based directed relationships among the existing nodes. Thus, the second stage refined document ontology 1000 may include the following additional directed relationships:

Countries→should explore→Logistic Service Providers→to support→UCC Equipment
UCC Equipment→supported by→Logistic Service Providers→is explored by→Countries
Countries→deploy→UCC Equipment As shown, the generated second stage refined document ontology 1000 of document D2 will include more detailed information as compared to the first stage refined document ontology 900, and hence may possess a relatively higher quality score as compared to that of the first stage refined document ontology 900 for document D2.

Figure 11:
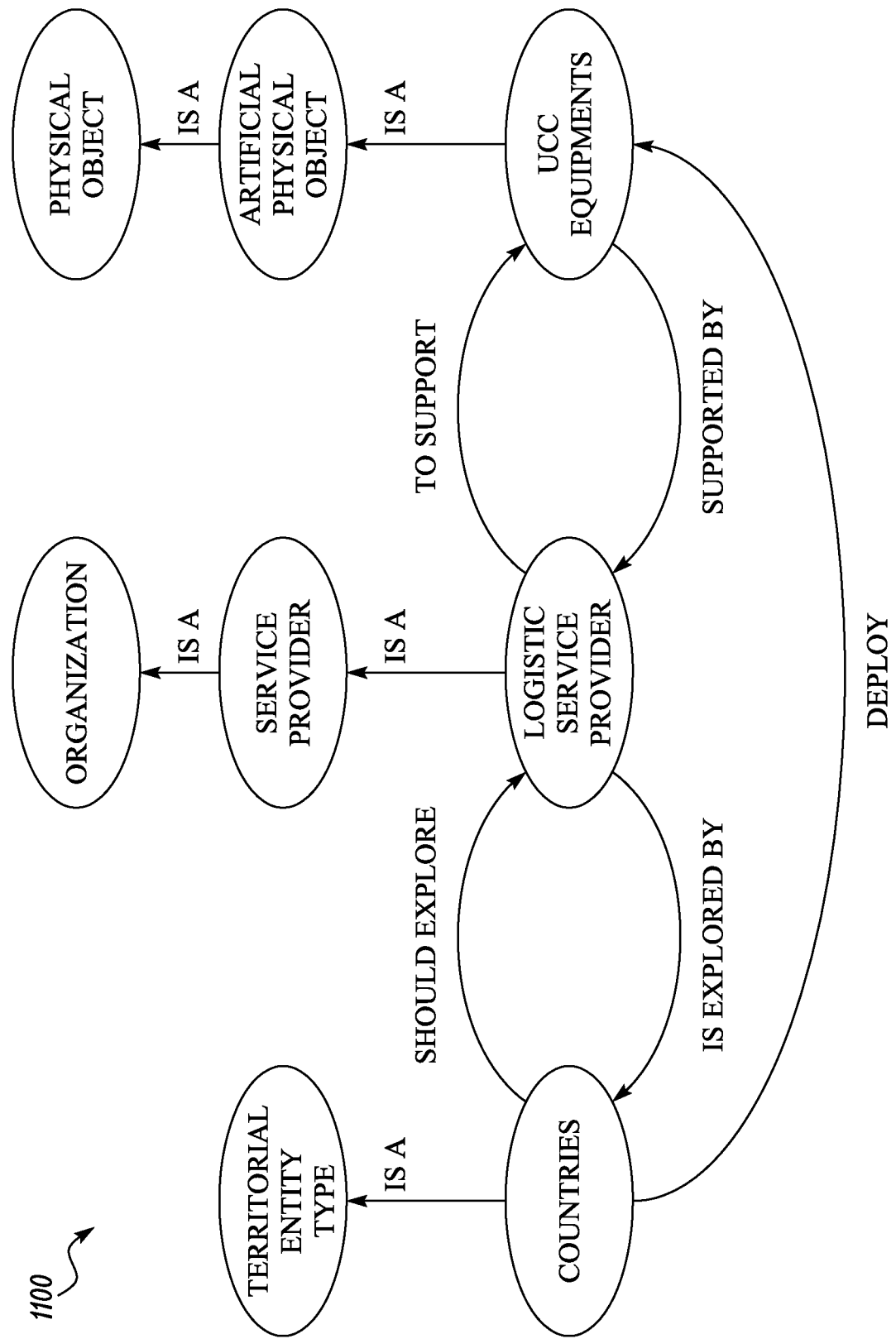

Furthermore, the taxonomic expansion unit 222 may be configured to extract one or more additional nodes and supplemental directional relationships among the additional nodes and the existing nodes of the second stage refined document ontology 1000, such as from the one or more auxiliary data sources 110 available via the Internet. As described previously herein, the one or more additional nodes may be the ones that are taxonomically or hierarchically linked to the existing nodes of the second stage refined document ontology 1000. FIG. 11 illustrates an exemplary third stage refined document ontology 1100 obtained from the second stage refined document ontology 1000 for the document D2, including the additional nodes and supplemental directional relationships among the additional nodes and the existing nodes.

For example, the taxonomic expansion unit 222 may identify the nodes "Service Provider" and "Organization" taxonomically linked to the existing node "Logistic Service Provider". Similarly, the additional nodes "Artificial Physical Object" and "Physical Object" may be identified as taxonomically linked to the existing node "UCC Equipment". Furthermore, the additional node "Territorial Entity Type" may be identified as taxonomically linked to the existing node "Country". Additionally, the taxonomic expansion unit 222 may identify the supplemental directional relationships to be "is a", as linking the additional nodes to the existing nodes, as illustrated. Thus, the taxonomic expansion unit 222 may be configured to generate the third stage refined document ontology 1100 for document D2 by including all the additional nodes and the supplemental directional relations therein.

The generated third stage refined document ontology 1100 may also be assessed by the ontology assessment unit 206 to determine the overall quality score SC2 based on the combination of syntactic assessment, semantic assessment, and the pragmatic assessment. In the illustrated example, the third stage refined document ontology 1100 may be considered optimized to satisfy the intended quality metric and thus, is determined to have an overall quality score SC2 greater than a threshold value. The generated third stage refined document ontology 1100 may be stored as the refined document ontology 1100 for the document D2, such as in the ontology database 108. The refined document ontology 1100, for example, may also be one of the refined document ontologies 304-N.

Figure 12:
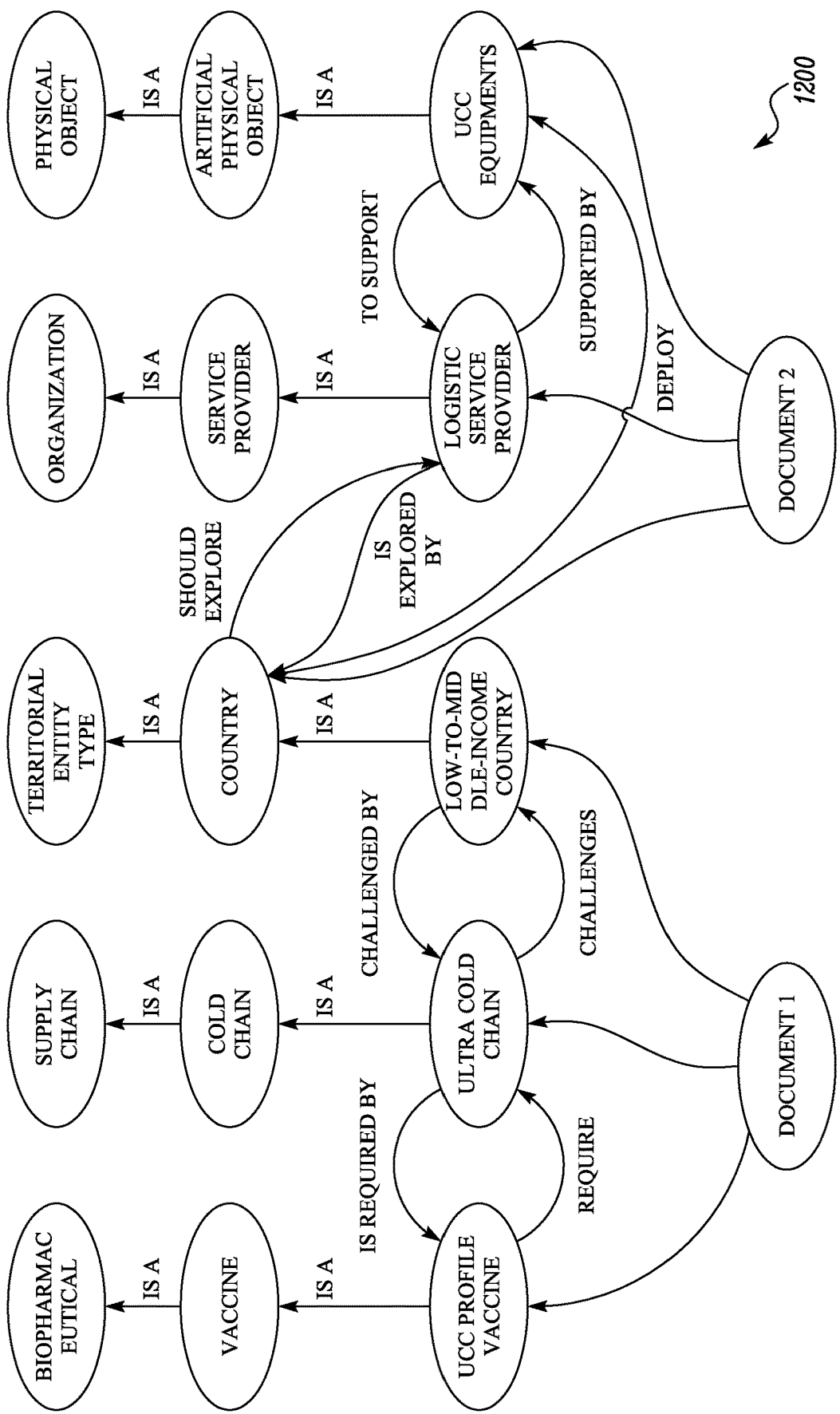
FIG. 12 illustrates an exemplary organization level ontology, in accordance with some embodiments.

FIG. 12 illustrates an exemplary organization level ontology 1200 generated by integrating, for example, the refined document ontologies 700 and 1100 corresponding to the documents D1 and D2, respectively. As described previously herein, the ontology integration unit 210 may be configured to integrate the refined document ontology 1100 of document D2 with the refined document ontology 700 of document D1. For example, as illustrated, the node "Country" may be identified as the common node in both the refined document ontology 700 of document D1 and the refined document ontology 1100 of document D2. Thus, the refined document ontology 1100 of document D2 is integrated with the refined document ontology 700 of document D1 by considering the node "Country" as the joining point, as illustrated, to form the organization level ontology 1200. The organization level ontology 1200, for example, may correspond to the organization level ontology 306 of FIG. 3.

Further, each of the documents D1 and D2 may be linked to the corresponding nodes within the organization ontology 1200. For example, as shown, the document D1 is linked to the nodes "UCC Profile Vaccine", "Ultra Cold Chain" and "Low-to-middle-income country". Similarly, document D2 is linked to the nodes "Country", "Logistic Service Provider" and "UCC equipment" within the organization level ontology 1200. Furthermore, the organization level ontology 1200, along with the linked documents, such as the documents D1 and D2, may be stored, for example, in the ontology database 108.

Knowledge Retrieval Using the Organization Level Ontology

Referring back to FIG. 1, as described previously herein, the knowledge retrieval system 120 may be configured to process one or more search queries using the organization level ontology, such as the organization level ontology 306 in one example. In an exemplary embodiment, the knowledge retrieval system 120 may be configured to receive one or more search queries from one or more users interacting with the ontology system 102, such as via the user devices 106 and search the organization level ontology 306 stored in the ontology database 108 to output one or more search results in response to the received search queries. For example, when an employee or any other user associated with the organization wishes to retrieve one or more documents in a particular field of the knowledge domain, then they may query the ontology system 102 and the knowledge retrieval system 120 may be configured to retrieve one or more documents that most closely answer the user's query.

In an exemplary embodiment, the knowledge retrieval system 120 may be configured to extract one or more nodes present within the received search query. The knowledge retrieval system 120 may be configured to use a pre-trained transformer based machine learning model for natural language processing, to extract the nodes from the search queries. In one implementation, the knowledge retrieval system 120 may be configured to utilize a pre-trained off-the-shelf language models, such as bidirectional transformers (e.g., Bidirectional Encode Representations from Transformers (BERT), that are already trained to identify the nodes in natural language processing.

For example, the knowledge retrieval system 120 may be configured to compare the identified nodes of the search query with the nodes within the organization level ontology 306 to generate search results based on the comparison. In some embodiments, the knowledge retrieval system 120 may be configured to match the words present in the search query to the terms representing the nodes within the organization level ontology 306 to determine one or more documents having the highest quantity of matching nodes linked to them. In such implementations, the knowledge retrieval system 120 may be configured to use fuzzy string matching techniques or direct string matching techniques, or any other similar techniques now known or in the future developed to detect a match between the words in the search query and the words present in the organization level ontology 306.

In some embodiments, the knowledge retrieval system 120 may be configured to determine embeddings vectors corresponding to the one or more words present within a particular search query. For example, the knowledge retrieval system 120 may utilize an embeddings transformers language model for creating embedding vectors representing the words within the search queries. In some instances, the embeddings transformers language model may be a pre-trained machine learning model trained based on a training text corpus.

As described previously herein, the organization level ontology 306 may also include embeddings corresponding to every node and directed relationship present therein. In an exemplary embodiment, the knowledge retrieval system 120 may be configured to compare embeddings determined for each of the search queries with the embeddings of the nodes and the directed relations within the organization level ontology 306 to provide one or more search results based on the comparison. For example, the knowledge retrieval system 120 may be configured to calculate a cosine similarity between the embeddings of the questions and the embeddings of the nodes in the organization level ontology 306 to determine the most relevant search results in response to the search queries. Generally, as will be understood by those skilled in the art, cosine similarity is a measure of similarity between two non-zero vectors of an inner product space. The cosine similarity may be defined as a trigonometric cosine of an angle between the two vectors, such as the embeddings of the search queries and the nodes and/or relationships within the ontology, such as the organization level ontology 306. For example, the positive cosine similarity may indicate a closer similarity between two vectors, whereas a negative cosine similarity may indicate that the two vectors are dissimilar to one another. The knowledge retrieval system 120 may be configured to utilize the cosine similarity of every node with respect to the search query to identify the most relevant documents to be provided as search results. Further details about how the cosine similarity of embeddings is used by the knowledge retrieval system 120 to provide the accurate and relevant search results will be described in conjunction with FIGS. 13-18 in the following paragraphs.

Figure 13:
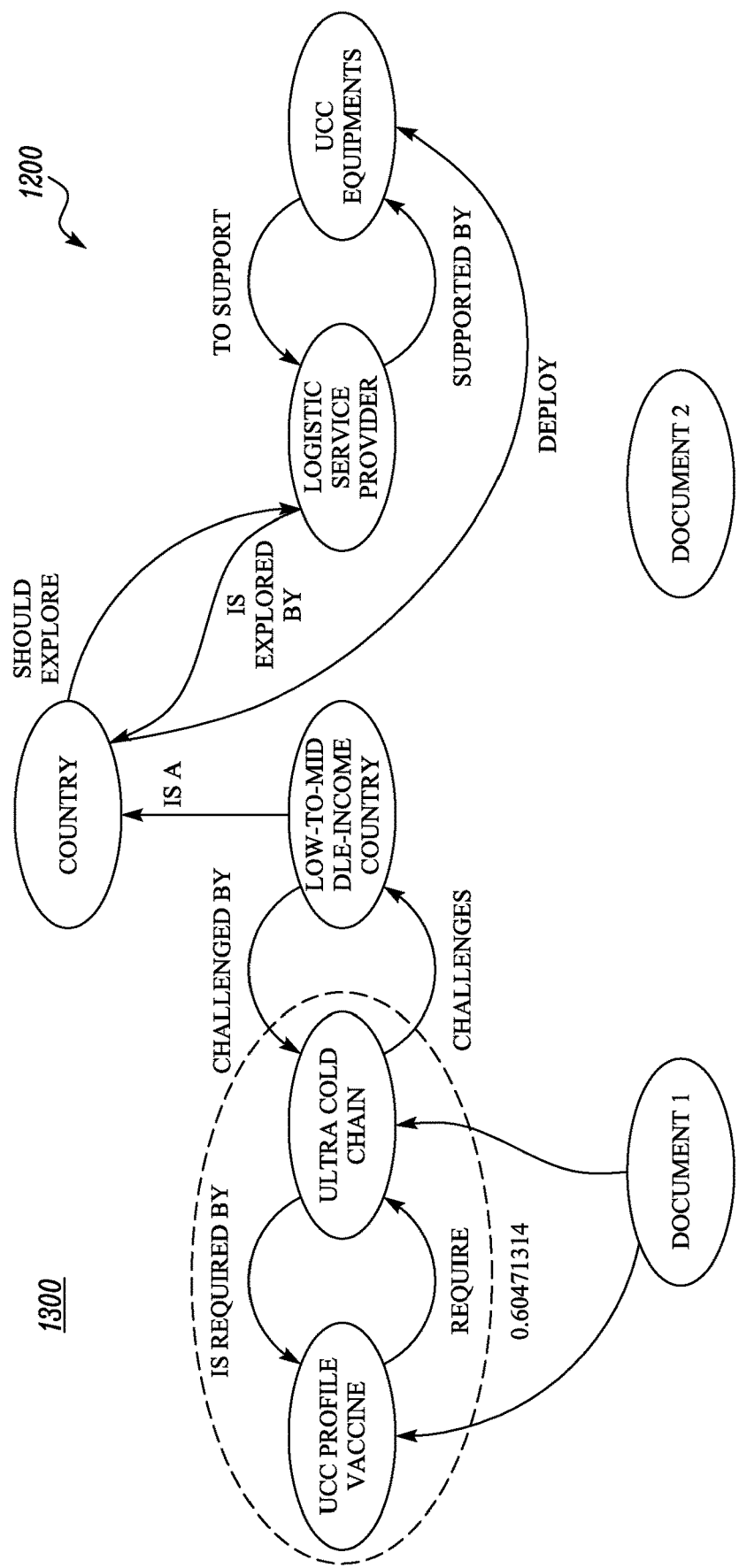
FIGS. 13 through 18 illustrate exemplary schematics of search strategies for processing a search query using the organization level ontology, in accordance with some embodiments.
Figure 14:
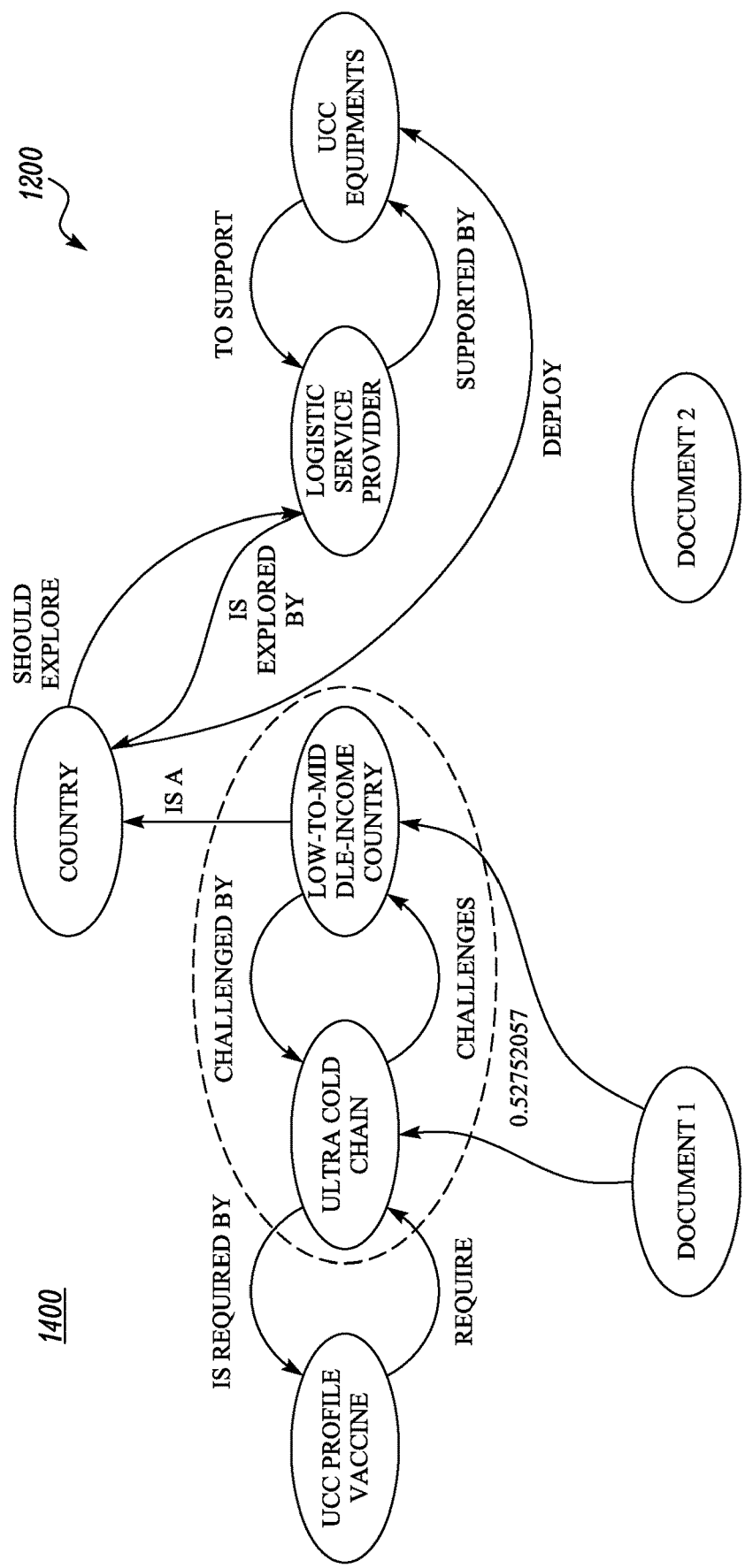

FIG. 13 illustrates an exemplary schematic 1300 for a first search strategy performed by the knowledge retrieval system 120 in response to a first search query. FIG. 14 illustrates an exemplary schematic 1400 for the first search strategy performed by the knowledge retrieval system 120 in response to a second search query. For the purposes of simplified explanations, the organization level ontology 1200 (only a portion shown in FIGS. 13 and 14) will be used to describe a first knowledge retrieval strategy performed by the knowledge retrieval system 120. The example first search query, received by the knowledge retrieval system 120 may be "Vaccination Challenges", whereas an example second search query, received by the knowledge retrieval system 120 may be "Logistics for Covid-19 vaccines".

The knowledge retrieval system 120 may calculate the embeddings for the words "vaccination" and "challenges" within the first search query and for the words "Logistics", "Covid-19" and "Vaccines" within the second search query. In this example strategy, the knowledge retrieval system 120 may be configured to calculate a cosine similarity between the embeddings of a search query and sentences within the organization level ontology 1200. For example, a sentence may be defined as (Node+Directed relationship+Node) within the organization level ontology 1200. Further, the knowledge retrieval system 120 may be configured to select a sentence within the organization level ontology 1200 that possesses the highest cosine similarity with the search queries. Thus, as shown in FIG. 13, a sentence corresponding to the encircled portion of the organization level ontology 1200, such as, "UCC Profile Vaccine require Ultra Cold Chain" may have a cosine similarity value of 0.60471314 with respect to the first search query. Similarly, as shown in FIG. 14, a sentence corresponding to the encircled portion of the organization level ontology 1200, such as, "Ultra Cold Chain challenges low to middle income country" may have a cosine similarity value of 0.52752057 with respect to the second search query.

Further, the knowledge retrieval system 120 may be configured to determine the sentence with the highest cosine similarity with the search questions as the winning sentence. Thus, the sentence "UCC Profile Vaccine require Ultra Cold Chain", shown in FIG. 13, is considered as the winning sentence having the highest similarity with the search queries. In an exemplary embodiment, the knowledge retrieval system 120 may be configured to obtain a set of documents containing the nodes conforming to the winning sentence and intersect the obtained set to identify the documents belonging to the intersection as the most relevant search results in response to the search queries. In the illustrated example, document D1 falls within the intersection of the set of documents containing nodes that conform to the winning sentence "UCC Profile Vaccine require Ultra Cold Chain". Thus, the document D1 may be provided as the search result in response to the first and the second search queries received by the knowledge retrieval system 120.

Figure 15:
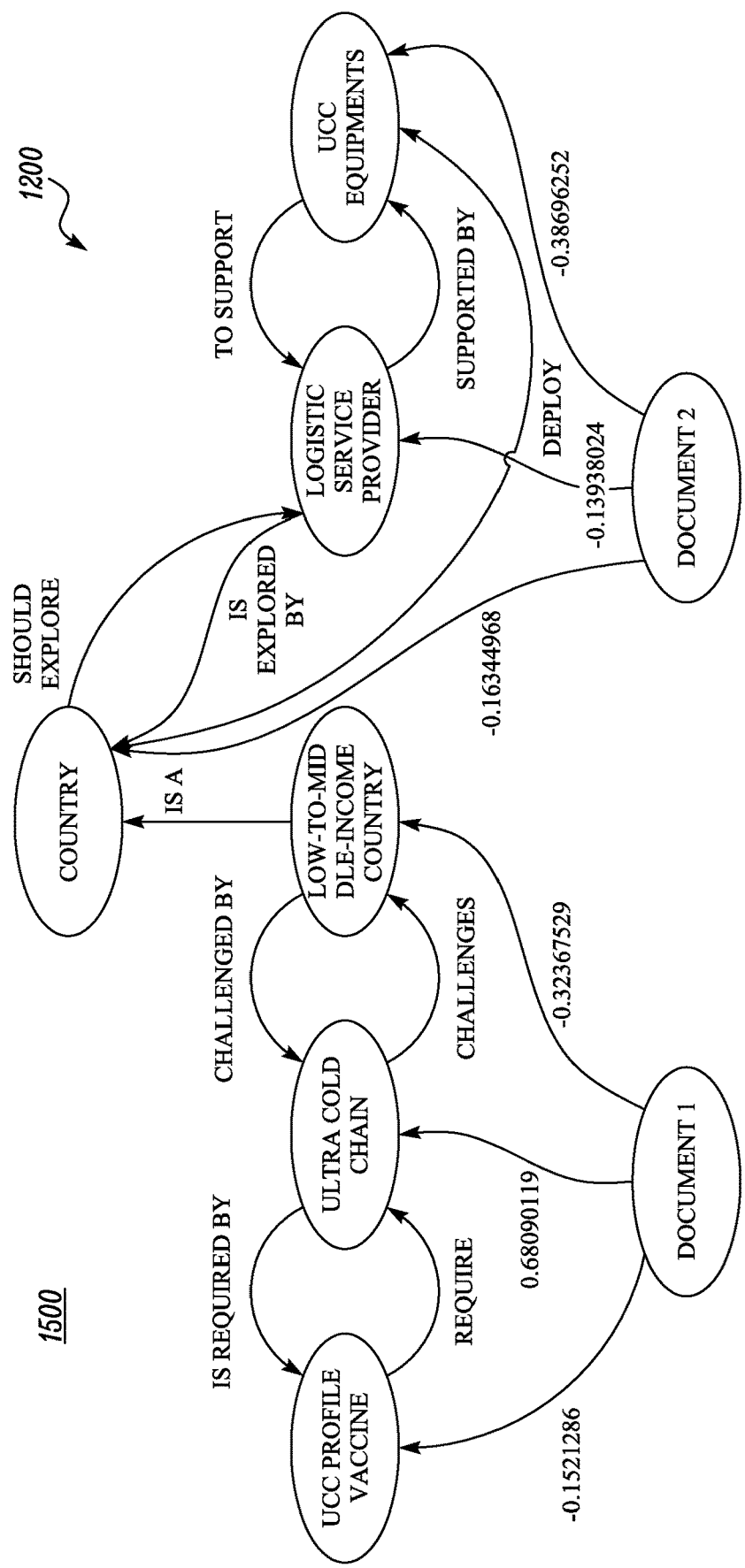
Figure 16:
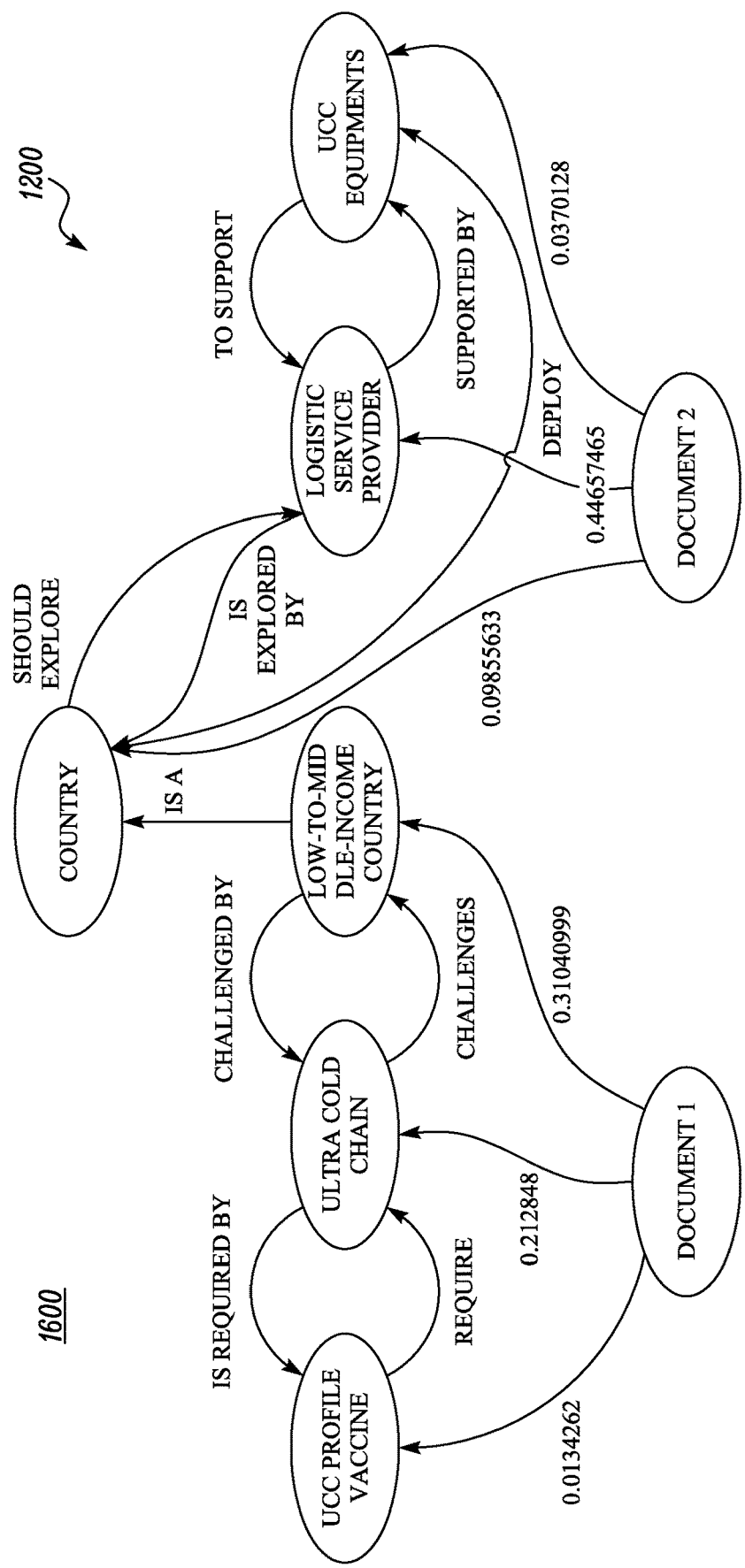

FIG. 15 illustrates an exemplary schematic 1500 representing the organization level ontology 1200 having the cosine similarity values of the nodes with respect to the first search query "Vaccination Challenges", for a second search strategy performed by the knowledge retrieval system 120 in response to the first search query. Similarly, FIG. 16 illustrates an exemplary schematic 1600 representing the organization level ontology 1200 with cosine similarity values of the nodes with respect to the second search query "Logistics for Covid-19 vaccines", for the second search strategy performed by the knowledge retrieval system 120 in response to the second search query. For the purposes of simplified explanations, the organization level ontology 1200 (only a portion shown in FIGS. 15 and 16) will be used to describe a second knowledge retrieval strategy performed by the knowledge retrieval system 120.

As shown in FIGS. 15 and 16, the following Table 1 illustrates the exemplary cosine similarity value for every node with respect to the first search query and the second search query:

| S. No. | Node | Cosine Similarity Value- Search query 1 | Cosine Similarity Value- Search query 2 |
|---|---|---|---|
| 1 | "UCC profile vaccine"- | −0.1521286 | 0.0134262 |
| 2 | "Ultra Cold chain" | 0.68090119 | 0.212848 |
| 3 | "Low-to-middle income country" | −0.32367529 | 0.31040999 |
| 4 | "Country" | −0.16344968 | 0.09855633 |
| 5 | "Logistic service provider" | −0.13938024 | 0.44657465 |
| 6 | "UCC equipment' | −0.38696252 | 0.0370128 |

As illustrated, nodes 1 through 3 may be linked to the document D1 whereas nodes 4 through 6 may be linked to the document D2. In an exemplary embodiment, the knowledge retrieval system 120 may be configured to use these cosine similarity values of each node with respect to the search queries to determine the document(s) that is most relevant for answering the specific search query.

According to the second knowledge retrieval strategy, the knowledge retrieval system 120 may be configured to determine a sum of cosine similarity values of each node with respect to the search queries for each document. Thus, the knowledge retrieval system 120 may be configured to determine a sum SM1 for document D1, calculated by adding the cosine similarity values of all the nodes (for example, nodes 1 through 3) linked to document D1. Similarly, the knowledge retrieval system 120 may be configured to determine a sum SM2 for document D2, calculated by adding the cosine similarity values of all the nodes (for example, nodes 4 through 6) linked to document D2. Further, in an exemplary embodiment, the knowledge retrieval system 120 may be configured to select a document that has the highest value of the sum of cosine similarity values as the search result in response to the search query. In another embodiment, the knowledge retrieval system 120 may be configured to provide a plurality of search results to the user in response to the search query, wherein the plurality of search results may be presented as sorted in descending order of the sum of cosine similarity values associated with every document within the plurality of search results.

In the above example, for the first search query, sum SM1 for the document D1 may be calculated as SM1=0.20509729999999998 whereas the sum SM2 for the document D2 may be calculated as SM2=−0.9133052799999999. Therefore, in response to the first search query, document D1 may be selected as the search result.

Further, for the second query, sum SM1 for the document D1 may be calculated as SM1=0.53668419 whereas the sum SM2 for the document D2 may be calculated as SM2=0.58214378, which is higher than the SM1 of document D1. Thus, for the second search query, document D2 may be selected as the search result.

According to a third knowledge retrieval strategy, the knowledge retrieval system 120 may be configured to determine an average of the cosine similarity values of each node with respect to the search queries for each document. Thus, the knowledge retrieval system 120 may be configured to determine an average AV1 for document D1, calculated by determining a mathematical average of the cosine similarity values of all the nodes (for example nodes 1 through 3) linked to document D1. Similarly, the knowledge retrieval system 120 may be configured to determine an average AV2 for document D2, calculated by determining a mathematical average of the cosine similarity values of all the nodes (for example, nodes 4 through 6) linked to document D2. Further, in an exemplary embodiment, the knowledge retrieval system 120 may be configured to select the document that has the highest average value as the search result in response to the search query In another embodiment, the knowledge retrieval system 120 may be configured to provide a plurality of search results to the user in response to the search query, wherein the plurality of search results are presented as sorted in descending order of the average of cosine similarity values associated with every document within the plurality of search results.

In the above example, for the first search query, the average AV1 for the document D1 may be calculated as AV1=0.06836576666666667 whereas the average AV2 for the document D2 may be calculated as AV2=−0.3044350933333333, which is lower than the average AV1 of the document D1. Therefore, in response to the first search query, document D1 may be selected as the search result.

Similarly, for the second query, the average AV1 for the document D1 may be calculated as AV1=0.17889473 whereas the average AV2 for the document D2 may be calculated as AV2=0.19404792666666668, which is higher than the average AV1 of document D1. Thus, for the second search query document D2 may be selected as the search result.

Figure 17:
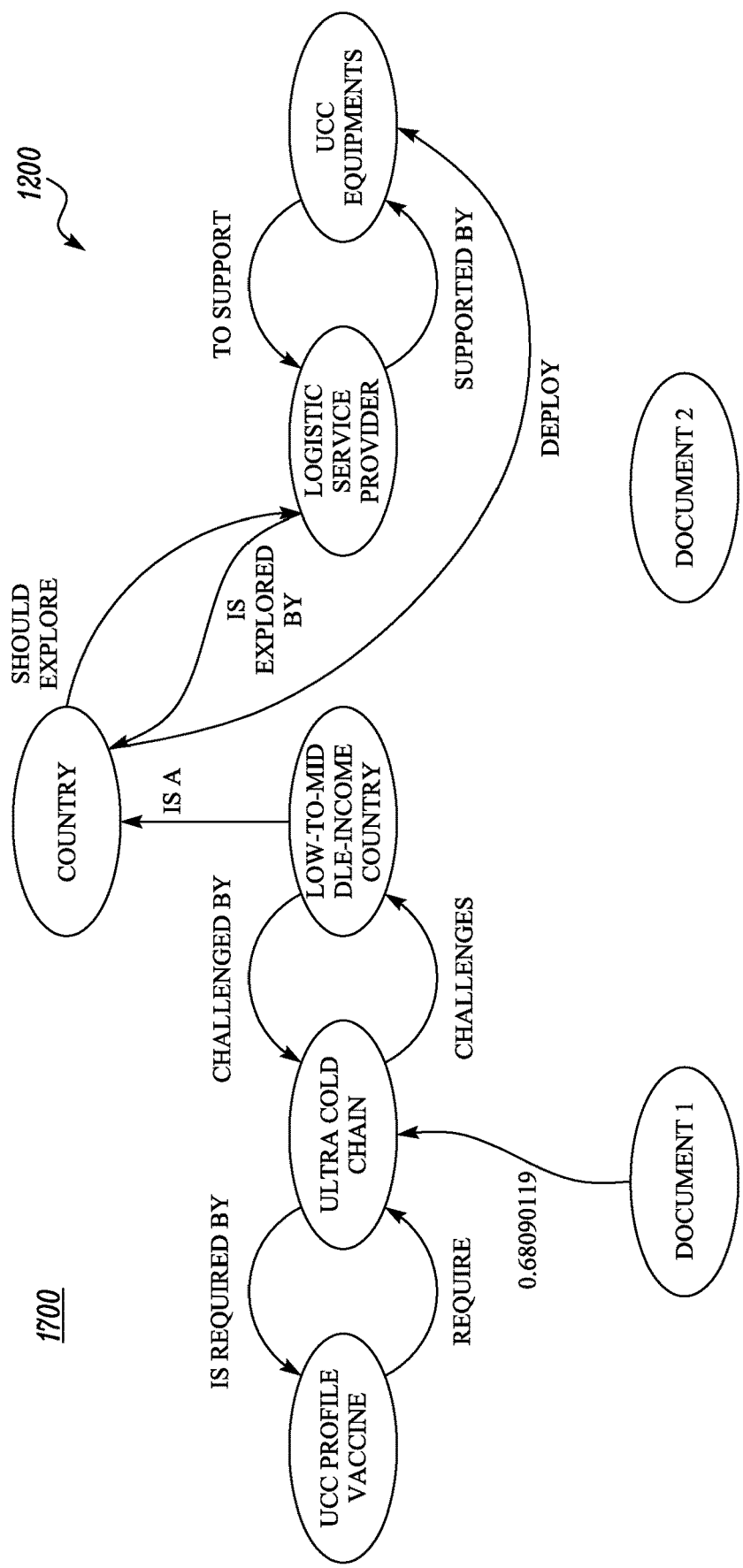
Figure 18:
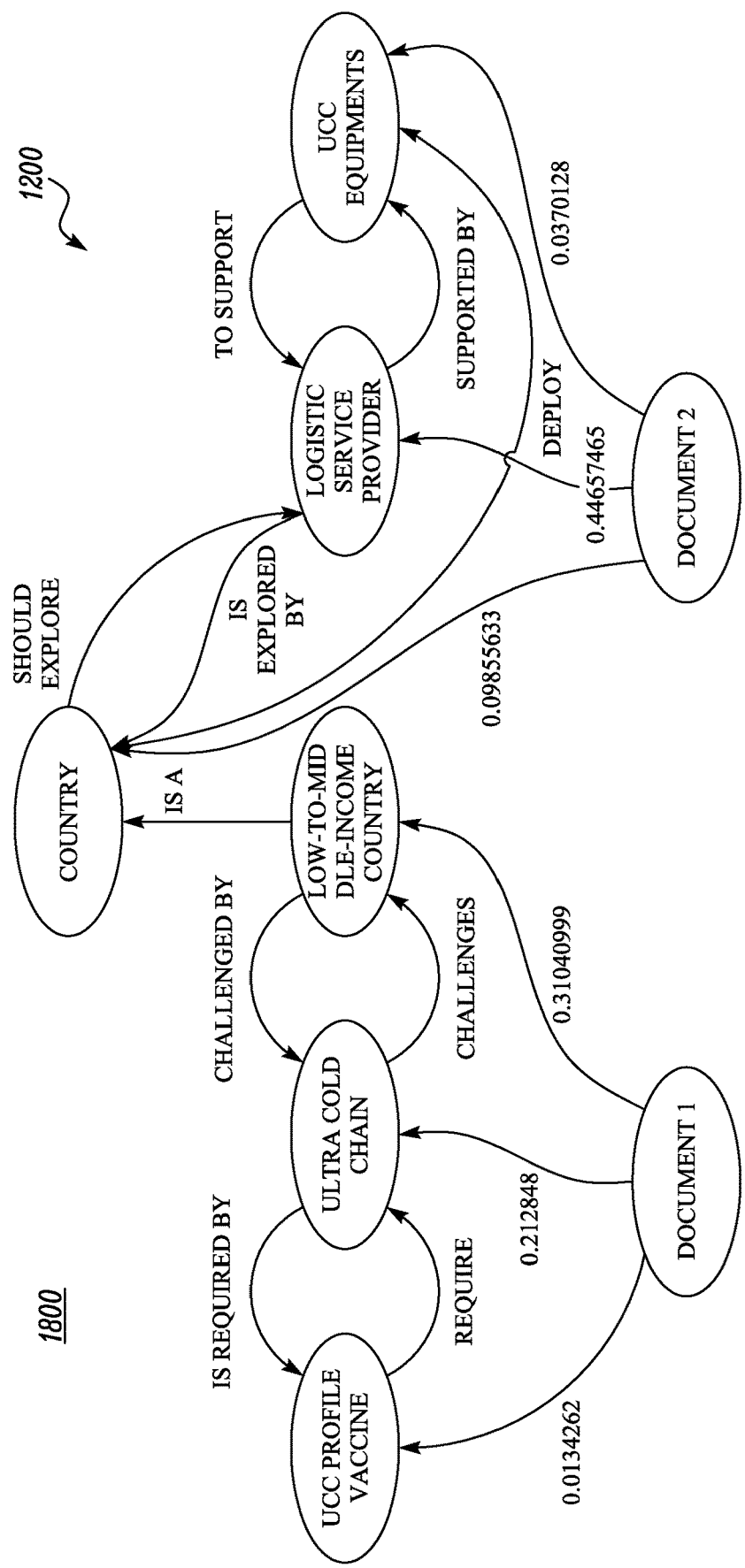

Further, FIG. 17 illustrates an exemplary schematic 1700 representing the organization level ontology 1200 with only positive cosine similarity values of the nodes with respect to the first search query "Vaccination Challenges" for a fourth search strategy performed by the knowledge retrieval system 120 in response to the first search query. Similarly, FIG. 18 illustrates an exemplary schematic 1800 representing the organization level ontology with only positive cosine similarity values of the nodes with respect to the second search query "Logistics for Covid-19 vaccines" for the fourth search strategy performed by the knowledge retrieval system 120 in response to the second search query. For the purposes of simplified explanations, the organization level ontology 1200 (only a portion shown in FIGS. 17 and 18) will be used to describe a fourth knowledge retrieval strategy performed by the knowledge retrieval system 120.

According to the fourth knowledge retrieval strategy, the knowledge retrieval system 120 may be configured to determine a count of nodes having positive cosine similarity values with respect to the search queries for each document. Thus, the knowledge retrieval system 120 may be configured to determine a count C1 for document D1, indicating a count of nodes having positive cosine similarity values, linked to document D1. Similarly, the knowledge retrieval system 120 may be configured to determine a count C2 for document D2, indicating a count of nodes having positive cosine similarity values, linked to document D2. Further, in an exemplary embodiment, the knowledge retrieval system 120 may be configured to select a document that has the highest count of nodes with positive cosine similarity values as the search result in response to the search query. In another embodiment, the knowledge retrieval system 120 may be configured to provide a plurality of search results to the user in response to the search query, wherein the plurality of search results are presented as sorted in descending order of the count of nodes having positive cosine similarity values associated with every document within the plurality of search results.

In the above example of Table 1 and as shown in FIG. 17, for the first search query, count C1 for the document D1 may be 1, whereas the count C2 for the document D2 may be 0. Therefore, in response to the first search query, document D1 may be selected as the search result.

Further, as shown in FIG. 18, for the second search query, the count C1 for the document D1 may be 3 and the count C2 for the document D2 may also be 3, which is equal to count C1 of document D1. Thus, for the second search query both the documents D1 and D2 may be selected as the search result.

According to a fifth search strategy, the knowledge retrieval system 120 may be configured to determine a sum of only positive cosine similarity values of the nodes with respect to the search queries for each document. Thus, the knowledge retrieval system 120 may be configured to determine a sum SMP1 for document D1, calculated by adding the positive cosine similarity values of the nodes linked to document D1. Similarly, the knowledge retrieval system 120 may be configured to determine a sum SMP2 for document D2, calculated by adding the positive cosine similarity values of the nodes linked to document D2. Further, in an exemplary embodiment, the knowledge retrieval system 120 may be configured to select a document that has the highest value of the sum of positive cosine similarity values as the search result in response to the search query. In another embodiment, the knowledge retrieval system 120 may be configured to provide a plurality of search results to the user in response to the search query, wherein the plurality of search results are presented as sorted in descending order of the stun of positive cosine similarity values associated with every document within the plurality of search results.

In the above example, for the first search query, sum SMP1 for the document D1 may be calculated as SMP1=0.68090119 whereas the sum SMP2 for the document D2 may be calculated as SMP2=0 (since there are no positive cosine similarity values for any node linked to document D2). Therefore, in response to the first search query, document D1 may be selected as the search result.

Further, for the second query, sum SMP1 for the document D1 may be calculated as SMP1=0.53668419 whereas the sum SMP2 for the document D2 may be calculated as SMP2=0.58214378, which is higher than the SMP1 of document D1. Thus, for the second search query document D2 may be selected as the search result.

According to yet another sixth knowledge retrieval strategy, the knowledge retrieval system 120, may be configured to determine an average of the positive cosine similarity values of a node with respect to the search queries for each document D1 and D2. Thus, the knowledge retrieval system 120 may be configured to determine an average AVP1 for document D1, calculated by determining a mathematical average of the positive cosine similarity values of the nodes linked to document D1. Similarly, the knowledge retrieval system 120 may be configured to determine an average AVP2 for document D2, calculated by determining a mathematical average of the positive cosine similarity values of the nodes linked to document D2. Further, in an exemplary embodiment, the knowledge retrieval system 120 may be configured to select a document that has the highest average value as the search result in response to the search query. In another embodiment, the knowledge retrieval system 120 may be configured to provide a plurality of search results to the user in response to the search query, wherein the plurality of search results are presented as sorted in descending order of the average of positive cosine similarity values associated with every document within the plurality of search results.

In the above example, for the first search query, the average AVP1 for the document D1 may be calculated as AVP1=0.68090119 whereas the average AVP2 for the document D2 may be calculated as AVP2=0, which is lower than the average AVP1 of the document D1. Therefore, in response to the first search query, document D1 may be selected as the search result.

Similarly, for the second search query, the average AVP1 for the document D1 may be calculated as AVP1=0.17889473 whereas the average AVP2 for the document D2 may be calculated as AVP2=0.1940479266666666668, which is higher than the average AVP1 of document D1. Thus, for the second search query document D2 may be selected as the search result.

It may be contemplated that the above mentioned cosine similarities values are merely exemplary and provided solely for the purposes of explanation. In practical applications, these cosine similarity values may vary with respect to the different documents, ontologies, and search queries.

As described previously herein, the knowledge retrieval system 120 may be configured to display, via the input/output unit 114 on a display, such as the display of the user device 106, the one or more search results obtained after processing the search queries using the organization level ontology, for example the organization level ontology 1200, generated by the ontology generation system 118. In an exemplary embodiment, the knowledge retrieval system 120 may be configured to display a traversable link to access the one or more documents corresponding to the search results in response to the received search queries.

Figure 19:
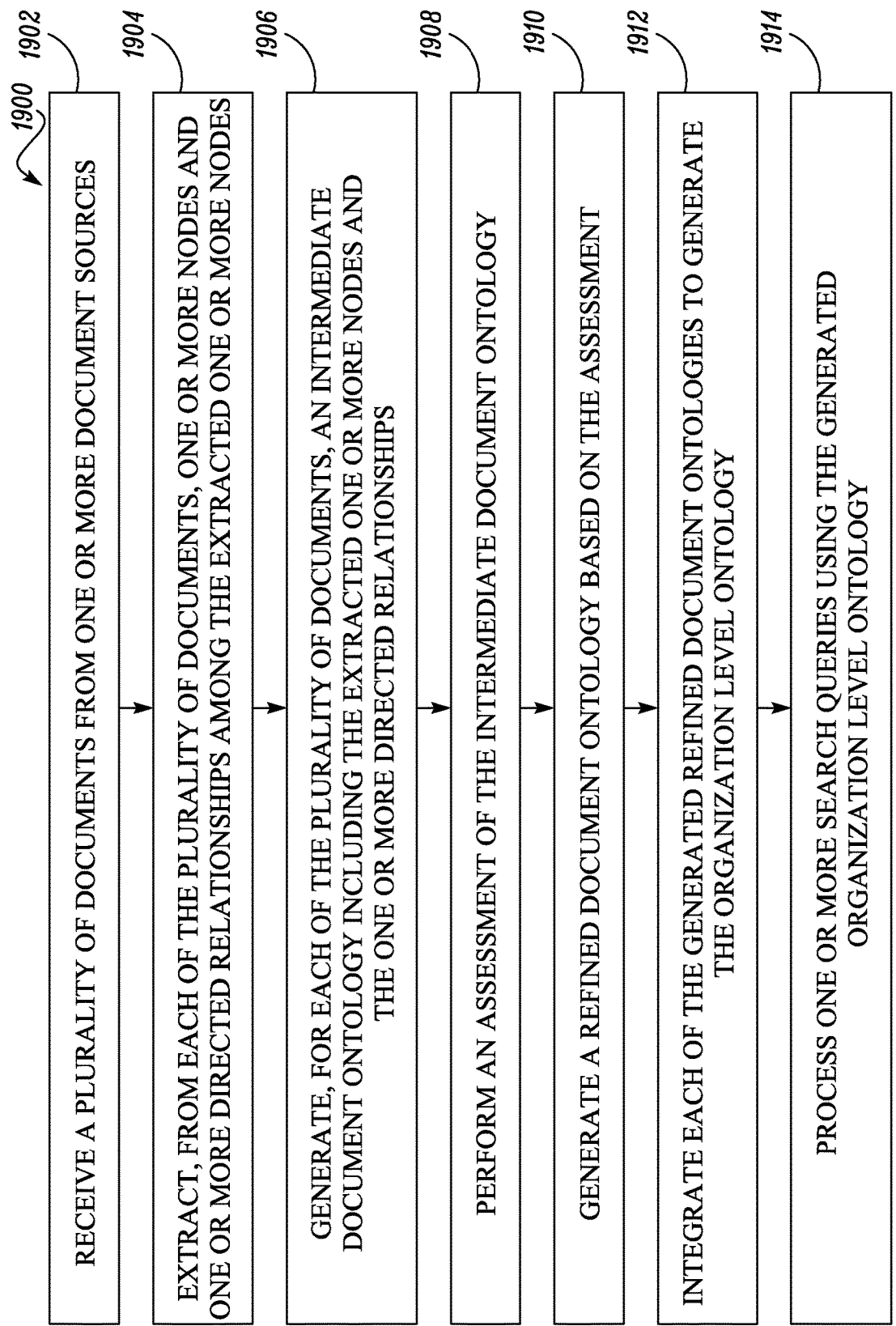
FIG. 19 illustrates an exemplary method for automatically generating an organization level ontology, in accordance with some embodiments.

FIG. 19 illustrates an exemplary method 1900 for automatically generating an organization level ontology for an organization. In an exemplary embodiment, the method 1900 may be performed by the ontology system 102. Initially, at operation 1902, a quantity of documents may be received from one or more document sources, such as the document sources 104. As described previously herein, the one or more document sources 104 may, in some embodiments, belong to the organization and may be configured to provide one or more documents that are relevant or associated with the organization.

At operation 1904, one or more nodes and directed relationships among the nodes are extracted for each document in the plurality of documents, such as by the extraction unit 202 of the ontology generation system 118. For example, the nodes may include, but not limited to, one or more natural language concepts, entities, and/or keywords. Similarly, the directed relations may link the nodes to one another in a particular direction.

At operation 1906, an intermediate document ontology, such as the intermediate document ontology 302-N, may be generated for each document, for example, by the generation unit 204 of the ontology generation system 118. The intermediate document ontology 302-N may include the extracted nodes and the directed relationships among the extracted nodes. In an example, the intermediate document ontology 302-N may be represented in the form of a directed graph including each of the extracted nodes and the directed relationships among the extracted nodes, wherein each node represents an edge while the directed relationship represents a link between two nodes in the directed graph.

Further, at operation 1908, an assessment of the generated intermediate document ontology 302-N is performed, for example, by the ontology assessment unit 206 of the ontology generation system 118. In an exemplary embodiment, the assessment may be a combination of a syntactic assessment, a semantic assessment, and a pragmatic assessment. These assessments may be configured to assess one or more of a structure, meaningfulness, and/or how clear and adaptable the generated intermediate document ontology is.

As described previously herein, the syntactic assessment unit 212 may be configured to assess the intermediate document ontology's 302-N structure to determine a first quality score S1 based on the syntactic richness score SR and the syntactic structure score SS. The semantic assessment unit 214 may be configured to assess the accuracy and clarity of the generated intermediate document ontology 302-N to determine a second quality score S2 based on the semantic precision score SP and the semantic variance score SV. Further, the pragmatic assessment unit 216 may be configured to assess the clarity and adaptability of the generated intermediate document ontology 302-N to determine a third quality score S3 based on the pragmatic clarity score PC and the pragmatic adaptability score PA. Furthermore, the ontology assessment unit 206 may be configured to determine an overall quality score S of the generated intermediate document ontology 302 based on the first quality score S1, the second quality score S2, and the third quality score S3.

At operation 1910, a refined document ontology, such as the refined document ontology 304-N, is generated for each document based on the assessment of the intermediate document ontology 302-N, for example, by the ontology refinement unit 208. In an exemplary embodiment, the refined document level ontology 304-N is optimized to satisfy one or more quality metrics. For this, the intermediate document ontology 302-N may be refined by disambiguating each of the extracted nodes, for example, by the disambiguation unit 218, based on auxiliary data received from, for example, one or more auxiliary data sources 110. The disambiguated document ontology may be further refined, for instance, by the enrichment unit 220, by including one or more context based relationships between the extracted one or more nodes in the intermediate document ontology 302-N. The context based relationships among the nodes may also be identified based on the received auxiliary data, for example, from the one or more auxiliary data sources 110. Further, the taxonomic expansion unit 222 may add one or more additional nodes that are taxonomically or hierarchically linked to the existing nodes in the intermediate document ontology 302-N. Additionally, the taxonomic expansion unit 222 may also add one or more supplemental directional relationships among the additional nodes and the existing nodes of the intermediate document ontology 302-N. In an exemplary embodiment, one or more additional nodes, as well as the supplemental directional relationships, may also be extracted based on the auxiliary data received, for example, from the one or more auxiliary data sources 110. In an exemplary implementation, the intermediate document ontology 302-N that has been refined by the disambiguation unit 218, the enrichment unit 220, and the taxonomic expansion unit 222 may be considered to be the refined document ontology, such as the refined document ontology 304-N for respective document, that has been optimized to satisfy the quality metrics.

At operation 1912, all of the generated refined document ontologies 304-N corresponding to the documents, are integrated and linked to generate the organization level ontology, such as the organization level ontology 306. In an exemplary embodiment, the ontology integration unit 210 may be configured to link the individually refined document ontologies 304-N, corresponding to each of the plurality of documents, with one another to generate the organization level ontology 306.

Furthermore, at operation 1914, one or more search queries may be processed using the generated organization level ontology 306, such as by the knowledge retrieval system 120. For example, the knowledge retrieval system 120 may be configured to process the search queries to generate one or more search results including one or more documents that are best suited to answer any particular search query. Further, the knowledge retrieval system 120 may be configured to display, on a display, such as the display of the user device 106, the one or more search results obtained after processing the search queries using the organization level ontology 306 generated by the ontology generation system 118. In an exemplary embodiment, the knowledge retrieval system 120 may also display, on the display of the user device 106, a traversable link to access the one or more documents corresponding to the search results in response to the received search queries.

The ontology system 102 and the method 1900 facilitate automatic generation of reliable, robust, comprehensive, and highly adaptable organization level ontologies for any organization. The organization level ontology, such as the organization level ontology 306, represented in the form of a directed graph, is readily understood by both humans and machines. Since the ontologies are generated, assessed, and refined at the document level, the entire processing is simplified and efficient. Additionally, since the document level ontologies are generated and refined modularly before integrating them into the organization level ontology, making any additions to the organization level ontology is simplified. Thus, a new document may be first processed to generate the refined document level ontology, which in itself is accurate, useful, and adaptable, and then the generated refined document ontology may be simply integrated into the more extensive organization level ontology without making significant and complex modifications to the entire structure of the organization level ontology.

Moreover, each of the document ontologies (including intermediate document ontologies 302 and the refined document ontologies 304) are assessed individually based on a combination of syntactic, semantic, and pragmatic assessment, which enhances the document level ontology and makes it accurate, comprehensible, usable, and adaptable to accommodate changes. Therefore, when such enhanced and refined document ontologies are integrated, the resultant organization level ontology is automatically made accurate, comprehensible, usable, and adaptable.

Furthermore, processing search queries using the organization level ontology, such as the organization level ontology 306, generated according to some embodiments, yield accurate and reliable search results. Moreover, the search results are presented along with a simple and useful traversable link to efficiently access one or more documents that may best answer a user query.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated by those of ordinary skill in the art that the various machine learning models described herein may utilize a convolutional neural network (CNN) or any machine learning methodology, now known or developed in the future. For example, the machine learning methodology utilized may be one or a combination of: Linear Classifiers (Logistic Regression, Naive Bayes Classifiers); Nearest Neighbor; Support Vector Machines; Decision Trees; Boosted Trees; Random Forest; and/or Neural Networks.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the description. This method is not to be interpreted as reflecting an intention that the claimed embodiments require more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

We claim:

1. A system for automatically generating an organization level ontology for knowledge retrieval, the system comprising:
   an input/output unit for receiving a plurality of documents from one or more document sources;
   a memory unit for storing the plurality of documents received from the one or more document sources;
   an ontology generation system for generating the organization level ontology, the ontology generation system being operatively coupled to the input/output unit and the memory unit and comprising:
   an extraction unit for extracting, from each of the plurality of documents, one or more nodes and one or more directed relationships among the extracted one or more nodes;
   a generation unit for generating, for each of the plurality of documents, an intermediate document ontology including the extracted one or more nodes and the one or more directed relationships;
   an ontology assessment unit for performing an assessment of the intermediate document ontology, the assessment being a combination of a syntactic assessment, a semantic assessment, and a pragmatic assessment of the intermediate document ontology to assess at least a structure and an adaptability of the intermediate document ontology;
   an ontology refinement unit for generating a refined document ontology based on the assessment, the refined document ontology being optimized to satisfy one or more quality metrics;
   an ontology integration unit for integrating each of the generated refined document ontologies to generate the organization level ontology; and
   a knowledge retrieval system, operatively coupled to the ontology generation system, for processing one or more search queries using the generated organization level ontology;
   wherein the input/output unit is configured to receive one or more auxiliary data associated with the extracted one or more nodes from one or more auxiliary data sources, and wherein the ontology refinement unit further comprises a taxonomic expansion unit for:
   extracting one or more additional nodes taxonomically linked with each of the extracted one or more nodes based on the received one or more auxiliary data;
   extracting one or more supplemental directional relationships among each of the extracted one or more additional nodes and the one or more nodes in the intermediate document ontology based on the received one or more auxiliary data; and
   refining the intermediate document ontology by including each of the extracted one or more additional nodes and the one or more supplemental directional relationships.

2. The system of claim 1, wherein the ontology assessment unit comprising:
   a syntactic assessment unit for performing the syntactic assessment of the intermediate document ontology to determine a first quality score corresponding to at least the structure of the intermediate document ontology:
   a semantic assessment unit for performing the semantic assessment of the intermediate document ontology to determine a second quality score corresponding to at least an accuracy of the intermediate document ontology; and
   wherein the pragmatic assessment of the intermediate document ontology comprises determining a third quality score corresponding at least to the adaptability of the intermediate document ontology.

3. The system of claim 2, wherein the syntactic assessment unit is configured to determine the first quality score based on a syntactic richness score and a syntactic structure score of the intermediate document ontology.

4. The system of claim 2, wherein the semantic assessment unit is configured to determine the second quality score based on a semantic precision score and a semantic variance score of the intermediate document ontology.

5. The system of claim 2, wherein the pragmatic assessment determines the third quality score based on a pragmatic clarity score and a pragmatic adaptability score of the intermediate document ontology.

6. The system of claim 1, wherein the one or more nodes and the directed relationships are extracted by using one or more pre-trained transformer based machine learning models for natural language processing.

7. The system of claim 1, wherein the input/output unit is configured to receive one or more auxiliary data associated with the extracted one or more nodes from one or more auxiliary data sources and wherein the ontology refinement unit further comprising:
   a disambiguation unit for refining the intermediate document ontology by disambiguating each of the extracted one or more nodes based on one or more aliases identified for each of the extracted one or more nodes from the received one or more auxiliary data; and an enrichment unit for refining the intermediate document ontology by including one or more context based relationships between the extracted one or more nodes in the intermediate document ontology, the one or more context based relationships being identified based on the received one or more auxiliary data.

8. The system of claim 1, wherein the knowledge retrieval system is configured to display, via the input/output unit on a display device, one or more search results identified based on the processing of the one or more search queries using the organization level ontology.

9. The system of claim 8, wherein the knowledge retrieval system is configured to display, via the input/output unit on the display device, a traversable pathway to access one or more documents corresponding to the identified one or more search results from the organization level ontology.

10. A method for automatically generating an organization level ontology for knowledge retrieval, the method comprising:
receiving, by an input/output unit, a plurality of documents from one or more document sources;
generating, by an ontology generation system, the organization level ontology based on the received plurality of documents, the generating of the organization level ontology comprising:
extracting, by an extraction unit, from each of the plurality of documents, one or more nodes and one or more directed relationships among the extracted one or more nodes;
generating, by a generation unit, for each of the plurality of documents, an intermediate document ontology including the extracted one or more nodes and the one or more directed relationships;
performing, by an ontology assessment unit, an assessment of the intermediate document ontology, the assessment being a combination of a syntactic assessment, a semantic assessment, and a pragmatic assessment of the intermediate document ontology to assess at least a structure and an adaptability of the intermediate document ontology;
generating, by an ontology refinement unit, a refined document ontology based on the assessment, the refined document ontology being optimized to satisfy one or more quality metrics;
integrating, by an ontology integration unit, each of the generated refined document ontologies to generate the organization level ontology;
processing, by a knowledge retrieval system operatively coupled to the ontology generation system, one or more search queries using the generated organization level ontology; and
receiving one or more auxiliary data associated with the extracted one or more nodes from one or more auxiliary data sources and wherein refining the intermediate document ontology further comprising:
extracting, by a taxonomic expansion unit of the ontology refinement unit, one or more additional nodes taxonomically linked with each of the extracted one or more nodes based on the received one or more auxiliary data;
extracting, by the taxonomic expansion unit of the ontology refinement unit, one or more supplemental directional relationships among each of the extracted one or more additional nodes and the one or more nodes in the intermediate document ontology based on the received one or more auxiliary data; and refining, by the taxonomic expansion unit of the ontology refinement unit, the intermediate document ontology by including each of the extracted one or more additional nodes and the one or more supplemental directional relationships.

11. The method of claim 10, wherein performing the assessment of the intermediate document ontology further comprising:
performing, by a syntactic assessment unit of the ontology assessment unit, the syntactic assessment of the intermediate document ontology to determine a first quality score corresponding to at least the structure of the intermediate document ontology;
performing, by a semantic assessment unit of the ontology assessment unit, the semantic assessment of the intermediate document ontology to determine a second quality score corresponding to at least an accuracy of the intermediate document ontology; and
performing, the pragmatic assessment of the intermediate document ontology to determine a third quality score corresponding to at least the adaptability of the intermediate document ontology.

12. The method of claim 11, wherein the first quality score is based on a syntactic richness score and a syntactic structure score of the intermediate document ontology.

13. The method of claim 11, wherein the second quality score is based on a semantic precision score and a semantic variance score of the intermediate document ontology.

14. The method of claim 11, wherein the third quality score is based on a pragmatic clarity score and a pragmatic adaptability score of the intermediate document ontology.

15. The method of claim 10, wherein the one or more nodes and the directed relationships are extracted by using one or more pre-trained transformer based machine learning models for natural language processing.

16. The method of claim 10 further comprising receiving one or more auxiliary data, associated with the extracted one or more nodes, from one or more auxiliary data sources and wherein refining the intermediate document ontology further comprising:
refining, by a disambiguation unit of the ontology refinement unit, the intermediate document ontology by disambiguating each of the extracted one or more nodes based on one or more aliases identified for each of the extracted one or more nodes from the received one or more auxiliary data; and
refining, by an enrichment unit of the ontology refinement unit, the intermediate document ontology by including one or more context based relationships between the extracted one or more nodes in the intermediate document ontology, the one or more context based relationships being identified based on the received one or more auxiliary data.

17. The method of claim 10 further comprising displaying, by the knowledge retrieval system via the input/output unit on a display device, one or more search results identified based on the processing of the one or more search queries using the organization level ontology.

18. The method of claim 17 further comprising displaying, by the knowledge retrieval system via the input/output unit on the display device, a traversable pathway to access one or more documents corresponding to the identified one or more search results from the organization level ontology.

* * * * *